US007470186B2

(12) United States Patent
Cannon

(10) Patent No.: US 7,470,186 B2
(45) Date of Patent: Dec. 30, 2008

(54) GAMING DEVICE HAVING A GAME WITH SEQUENTIAL DISPLAY OF NUMBERS

(75) Inventor: Lee E. Cannon, Bozeman, MT (US)

(73) Assignee: IGT, Reno, NV (US)

(*) Notice: Subject to any disclaimer, the term of this patent is extended or adjusted under 35 U.S.C. 154(b) by 844 days.

(21) Appl. No.: 10/639,715

(22) Filed: Aug. 12, 2003

(65) Prior Publication Data

US 2005/0037832 A1 Feb. 17, 2005

(51) Int. Cl.
*G06F 17/00* (2006.01)
*G06F 19/00* (2006.01)

(52) U.S. Cl. .............................. 463/18; 463/16; 463/20; 463/25

(58) Field of Classification Search .................... 463/18
See application file for complete search history.

(56) References Cited

U.S. PATENT DOCUMENTS 3,533,629 A 10/1970 Raven et al.
4,033,588 A 7/1977 Watts
4,157,829 A 6/1979 Goldman et al.
4,335,809 A 6/1982 Wain
4,339,798 A 7/1982 Hedges et al.
4,467,424 A 8/1984 Hedges et al.
4,494,197 A 1/1985 Troy et al.
4,582,324 A 4/1986 Koza et al.
4,652,998 A 3/1987 Koza et al.
4,669,730 A 6/1987 Small
4,689,742 A 8/1987 Troy et al.
4,695,053 A 9/1987 Vazquez et al.
4,756,531 A 7/1988 DiRe et al.
4,775,155 A 10/1988 Lees (Continued)

FOREIGN PATENT DOCUMENTS

GB 2 374 294 A 10/2002

(Continued)

OTHER PUBLICATIONS

Big Top Keno Advertisement, written by Aristocrat, published Oct. 2000.

(Continued)

*Primary Examiner*—Robert E Pezzuto
*Assistant Examiner*—Milap Shah
(74) *Attorney, Agent, or Firm*—Bell, Boyd & Lloyd, LLP

(57) ABSTRACT

A number matching game which can be employed in both a gaming device and in live gaming at a casino. The player picks one or more numbers from a number pool. The gaming device or house draws randomly at least one number from the pool. An award is provided to the player based on an amount of matches between the player selected number(s) and the game drawn number(s). In one embodiment, when the game displays a player picked number, the game also displays if the number results in a match. In another embodiment, one or more of either or both of the game drawn number and player selected number is weighted, for example by attaching different amounts of points to the numbers, wherein the award is based on the accumulated points of matched numbers. The above embodiments are combined and can have various outcomes, such as bonus outcomes.

31 Claims, 16 Drawing Sheets

U.S. PATENT DOCUMENTS

| | | | | |
|---|---|---|---|---|
| 4,805,907 | A | 2/1989 | Hagiwara | |
| 4,815,741 | A | 3/1989 | Small | |
| 4,817,951 | A | 4/1989 | Crouch et al. | |
| 4,836,546 | A | 6/1989 | DiRe | |
| 4,836,548 | A | 6/1989 | Chittenden | |
| 4,842,278 | A | 6/1989 | Markowicz | |
| 4,856,787 | A | 8/1989 | Itkis | |
| 4,982,337 | A | 1/1991 | Burr et al. | |
| 5,042,809 | A | 8/1991 | Richardson | |
| 5,046,737 | A | 9/1991 | Fienberg | |
| 5,092,598 | A | 3/1992 | Kamille | |
| 5,100,139 | A | 3/1992 | Di Bella | |
| 5,116,049 | A | 5/1992 | Sludikoff et al. | |
| 5,158,293 | A | 10/1992 | Mullins | |
| 5,242,163 | A | 9/1993 | Fulton | |
| 5,265,874 | A | 11/1993 | Dickinson et al. | |
| 5,276,312 | A | 1/1994 | McCarthy | |
| 5,282,620 | A | 2/1994 | Keesee | |
| 5,324,035 | A | 6/1994 | Morris et al. | |
| 5,398,932 | A | 3/1995 | Eberhardt et al. | |
| 5,401,024 | A | 3/1995 | Simunek | |
| 5,407,199 | A | 4/1995 | Gumina | |
| 5,586,937 | A | 12/1996 | Menashe | |
| 5,611,729 | A | 3/1997 | Schumacher et al. | |
| 5,628,684 | A | 5/1997 | Bouedec | |
| 5,639,089 | A | 6/1997 | Matsumoto et al. | |
| 5,647,798 | A | 7/1997 | Falciglia | |
| 5,651,735 | A * | 7/1997 | Baba | 463/18 |
| 5,664,998 | A | 9/1997 | Seelig et al. | |
| 5,674,128 | A | 10/1997 | Holch et al. | |
| 5,718,631 | A | 2/1998 | Invencion | |
| 5,755,619 | A | 5/1998 | Matsumoto et al. | |
| 5,779,545 | A | 7/1998 | Berg et al. | |
| 5,800,269 | A | 9/1998 | Holch et al. | |
| 5,871,398 | A | 2/1999 | Schneier et al. | |
| 5,909,875 | A | 6/1999 | Weingardt | |
| 5,935,002 | A | 8/1999 | Falciglia | |
| 5,944,606 | A | 8/1999 | Gerow | |
| 5,949,042 | A | 9/1999 | Dietz, II et al. | |
| 5,954,582 | A | 9/1999 | Zach | |
| 5,970,143 | A | 10/1999 | Schneier et al. | |
| 5,971,849 | A | 10/1999 | Falciglia | |
| 5,997,400 | A | 12/1999 | Seelig et al. | |
| 6,017,032 | A | 1/2000 | Grippo et al. | |
| 6,024,640 | A | 2/2000 | Walker et al. | |
| 6,033,306 | A | 3/2000 | De Souza | |
| 6,079,711 | A | 6/2000 | Wei et al. | |
| 6,089,976 | A | 7/2000 | Schneider et al. | |
| 6,089,982 | A | 7/2000 | Holch et al. | |
| 6,099,408 | A | 8/2000 | Schneier et al. | |
| 6,102,400 | A | 8/2000 | Scott et al. | |
| 6,117,009 | A | 9/2000 | Yoseloff | |
| 6,129,632 | A | 10/2000 | Luciano | |
| 6,146,272 | A | 11/2000 | Walker et al. | |
| 6,168,521 | B1 | 1/2001 | Luciano et al. | |
| 6,183,361 | B1 | 2/2001 | Cummings et al. | |
| 6,203,428 | B1 | 3/2001 | Giobbi et al. | |
| 6,210,275 | B1 | 4/2001 | Olsen | |
| 6,210,276 | B1 | 4/2001 | Mullins | |
| 6,210,279 | B1 | 4/2001 | Dickinson | |
| 6,217,448 | B1 | 4/2001 | Olsen | |
| 6,220,961 | B1 | 4/2001 | Keane et al. | |
| 6,241,606 | B1 | 6/2001 | Riendeau et al. | |
| 6,250,685 | B1 | 6/2001 | Walker et al. | |
| 6,254,480 | B1 | 7/2001 | Zach | |
| 6,270,407 | B1 * | 8/2001 | Dodge | 463/18 |
| 6,273,820 | B1 | 8/2001 | Haste, III | |
| 6,280,328 | B1 | 8/2001 | Holch et al. | |
| 6,283,855 | B1 | 9/2001 | Bingham | |
| 6,309,298 | B1 | 10/2001 | Gerow | |
| 6,309,299 | B1 * | 10/2001 | Weiss | 463/20 |
| 6,315,291 | B1 | 11/2001 | Moody | |
| 6,325,716 | B1 | 12/2001 | Walker et al. | |
| 6,336,862 | B1 | 1/2002 | Byrne | |
| 6,358,151 | B1 | 3/2002 | Enzminger et al. | |
| 6,364,313 | B1 | 4/2002 | Moody | |
| 6,368,213 | B1 * | 4/2002 | McNabola | 463/18 |
| 6,368,214 | B1 | 4/2002 | Luciano | |
| 6,368,218 | B2 | 4/2002 | Angell, Jr. | |
| 6,398,644 | B1 | 6/2002 | Perrie et al. | |
| 6,398,645 | B1 | 6/2002 | Yoseloff | |
| 6,402,614 | B1 | 6/2002 | Schneier et al. | |
| 6,419,583 | B1 | 7/2002 | Crumby et al. | |
| 6,425,823 | B1 | 7/2002 | Byrne | |
| 6,443,837 | B1 | 9/2002 | Jaffe et al. | |
| 6,450,885 | B2 | 9/2002 | Schneier et al. | |
| 6,454,648 | B1 | 9/2002 | Kelly et al. | |
| RE37,885 | E | 10/2002 | Acres et al. | |
| 6,464,582 | B1 | 10/2002 | Baerlocher et al. | |
| 6,475,086 | B2 | 11/2002 | Zach | |
| 6,478,677 | B1 | 11/2002 | Moody | |
| 6,508,711 | B1 | 1/2003 | Ono | |
| 6,514,144 | B2 | 2/2003 | Riendeau et al. | |
| 6,524,184 | B1 | 2/2003 | Lind et al. | |
| 6,527,638 | B1 | 3/2003 | Walker et al. | |
| 6,533,660 | B2 | 3/2003 | Seelig et al. | |
| 6,533,664 | B1 | 3/2003 | Crumby | |
| 6,537,150 | B1 | 3/2003 | Luciano et al. | |
| 6,645,071 | B2 | 11/2003 | Perrie et al. | |
| 6,656,044 | B1 | 12/2003 | Lewis | |
| 6,702,699 | B2 | 3/2004 | Touhey et al. | |
| 6,729,961 | B1 | 5/2004 | Millerschone | |
| 6,739,970 | B2 | 5/2004 | Luciano | |
| 6,749,500 | B1 | 6/2004 | Nelson et al. | |
| 6,755,738 | B2 * | 6/2004 | Glasson et al. | 463/19 |
| 6,764,397 | B1 | 7/2004 | Robb | |
| 6,824,465 | B2 | 11/2004 | Luciano, Jr. | |
| 6,855,055 | B2 | 2/2005 | Perrie et al. | |
| 6,921,334 | B1 | 7/2005 | Bennett | |
| 7,179,167 | B2 * | 2/2007 | deKeller | 463/18 |
| 2002/0010013 | A1 | 1/2002 | Walker et al. | |
| 2002/0010015 | A1 * | 1/2002 | Acres | 463/18 |
| 2002/0058545 | A1 | 5/2002 | Luciano | |
| 2002/0072404 | A1 | 6/2002 | Gerow | |
| 2002/0082070 | A1 | 6/2002 | Macke et al. | |
| 2002/0098882 | A1 | 7/2002 | Lind et al. | |
| 2002/0098883 | A1 | 7/2002 | Packes, Jr. et al. | |
| 2002/0111214 | A1 | 8/2002 | Lind et al. | |
| 2002/0113369 | A1 | 8/2002 | Weingardt | |
| 2002/0169018 | A1 | 11/2002 | Schneier et al. | |
| 2003/0181234 | A1 | 9/2003 | Falciglia, Sr. | |
| 2003/0193136 | A1 | 10/2003 | Walker et al. | |
| 2004/0106445 | A1 | 6/2004 | Perrie et al. | |
| 2005/0014553 | A1 | 1/2005 | Byrne | |
| 2005/0227753 | A1 | 10/2005 | Luciano, Jr. | |

FOREIGN PATENT DOCUMENTS

| | | | |
|---|---|---|---|
| WO | WO02/097749 | A2 | 12/2002 |
| WO | WO2004/014502 | A2 | 2/2004 |

OTHER PUBLICATIONS

Bingo Advertisement, written by WMS Gaming, Inc., published prior to 2003.

Bingo Ball Bingo Advertisement, written by BCSI Corporation, published prior to 2003.

Bingo Brasil Advertisement, written by Unidesa Gaming, published prior to 2003.

Bingo Advertisement, written by Casino Data Systems, published 1998.

Bingo Game Station Advertisement, written by Cole Gaming Technologies, published prior to 2003.

Bingo Party Advertisement, written by Amatic Industries, published 2001.

Bingo Slot Advertisement, written by Unidesa Gaming, published prior to 2003.
Bingo Slots Advertisement, written by Odds on Gaming, published prior to 2003.
Bingo Wizard Advertisement, written by Applied Concepts, published 2002.
Bonus Bingo Advertisement, written by Unidesa Gaming, published prior to 2003.
California Dreams Advertisement, written by Cadillac Jack, published prior to 2003.
Canadian Bingo Advertisement, written by Unidesa Gaming, published prior to 2003.
Cash Keno Advertisement, written by IGT, published prior to 2003.
Diamond Keno Advertisement, written by Magic Gaming, published prior to 2003.
Diamonopoly Advertisement, written by International Gamco, Inc., published 2002.
Dual Screen Keno Machine Picture Advertisement, written by Acres Gaming & Technology, published prior to 2003.
Electronic Pull Tabs Advertisement, written by 21st Century Gaming, published prior to 2002.
Flamingo Reno-Keno, published prior to 2003.
Five Card Instant Bingo Advertisement, written by IGT, published 2000.
Four Card Keno Game Screen Advertisement, written by IGT, published prior to 2003.
Gold Touch Multi-Game Advertisement, written by Cadillac Jack, published prior to 2003.
Instant Bingo Video Slots Advertisement, written by IGT, published 2002.
Instant Winner Advertisement, written by Williams/WMS Gaming, published prior to 2003.
Lucky Times California Lottery Newsletter, published 1996.
Keno Alley Cat Advertisement, written by IGT, published prior to 2003.
Keno Caveman Advertisement, written by IGT, published prior to 2003.
Keno Advertisement, written by Odds on Gaming, published prior to 2003.
Keno Advertisement, written by WMS Gaming, Inc., published prior to 2003.
Keno Advertisement, written by Cyberdyne Gaming, published prior to 2003.
Krazy Keno Advertisement, written by Silicon Gaming, published prior to 2001.
Krazy Keno/Star Spangled Keno Advertisement, written by Silicon Gaming, published prior to 2001.
Party Time Bingo Advertisement, written by Astra Games Limited, published prior to 2003.
Play it Again Advertisement, written by International Gamco, Inc., published 2000.
Pot 'O Gold Advertisement, written by Vision Gaming & Technology, published prior to 2003.
Reel Bingo Advertisement, written by B Soft, published prior to 2003.
Southern Gold Advertisement, written by Cadillac Jack, published prior to 2003.
Star Spangled Keno, Advertisement, written by Silicon Gaming, published 2001.
Ultimate Keno Advertisement, written by Bally Gaming Systems, published 2000.
Bingo Game Station Advertisement, written by Cole Gaming Technologies, published prior to 2003.
Free Game Keno, written by Keno-Info.com (website: www.keno-info.com/free_keno_game.html), website published 2002, printed on Aug. 11, 2002.
Alley Cat Keno Game Description, written by IGT, available prior to Aug. 12, 2003.
Cleopatra Bingo Advertisement, written by IGT, published in 2000 and 2004.
Slingo Games, written by Slingo.com Slingo Games (website: www.slingo.com/games/online/game.php), printed on Apr. 25, 2003.
Cash Keno Paytable, written by IGT, available prior to 2003.
Lucky Times California Lottery Newsletter, published 1996.
Triple Diamond Keno Paytable, written by IGT, available prior to 2003.

* cited by examiner

FIG. 8

| ACTIVITY | DISPLAY |
|---|---|
| ARCHERS | TARGET DISPLAYS HIT AREAS OR DRAWS, MATCHES HIT PART OF TARGET, MISSES MISS TARGET |
| HUNTING | HIT AREAS OR DRAWS DISPLAYED AS VARIOUS GAME ANIMALS, MATCHES HIT ANIMAL,MISSES HIT ELSEWHERE, POSSIBLE NEGATIVE COUNT FOR HITTING GAME WARDEN, BONUS COUNT FOR HITTING ELUSIVE GAME |
| SHUFFLEBOARD | TARGETS ARE DIFFERENT SHUFFLEBOARD AREAS, MATCHES HIT AREA, MISSES LAND OUTSIDE OF AREA, CAN USE ANY AREA FOR MORE THAN ONE DRAW NUMBER |
| POOL | TARGETS ARE DIFFERENT POOL POCKETS, MATCHES SHOW BALL LANDING IN POCKET, MISSES SHOW BALL MISS POCKET, CAN USE ANY POCKET FOR MORE THAN ONE DRAW NUMBER, NEGATIVE COUNT FOR SCRATCH |
| EQUESTRIAN RIDING / DOG JUMPING | DRAWS DISPLAYED AS JUMP CITES, PICKS DISPLAYED AS ACT OF JUMPING, MATCHES SHOWN AS SUCCESSFUL JUMPS, MISSES SHOWN AS UNSUCCESSFUL JUMPS. ONE JUMP CAN CORRESPOND TO MULTIPLE DRAWS. |

FIG. 10

| ACTIVITY | DISPLAY |
| --- | --- |
| FOOTBALL | MATCH IS COMPLETED PASS. MISS IS INCOMPLETE PASS, POSSIBLE NEGATIVE COUNT FOR SACK, BONUS COUNT FOR TOUCHDOWN. |
| BASEBALL | MATCH IS BASE HIT, MISS IS POP-FLY OR GROUND OUT, POSSIBLE NEGATIVE COUNT FOR STRIKE-OUT, BONUS COUNT FOR HOME RUN |
| HOCKEY OR SOCCER | MATCH IS GOAL, MISS IS SHOT BLOCKED OR NOT ON NET. |
| SKIING, JUMPING OR DOWNHILL SLALOM | MATCH IS SUCCESSFUL JUMP, MISS IS WRECK. FOR DOWNHILL SLALOM, DRAWS ARE FLAGS, MATCH IS SUCCESSFUL SLALOM, MISS IS UNSUCCESSFUL SLALOM. |
| RACING, HORSE OR CARS. | MATCH IS WINNING RACE OR PASSING COMPETITOR, LOSE IS LOSING RACE OR FALLING BEHIND COMPETITOR. |

| PTS | 1 CREDIT PAYS |
|---|---|
| 10-15 | $ 4.00 |
| 16-20 | $ 18.00 |
| 21-25 | $ 106.00 |
| 26-29 | $ 750.00 |
| 30-34 | $ 3375.00 |
| 35-37 | $ 7500.00 |

| PTS | 1 CREDIT PAYS |
|---|---|
| 10-15 | $ 4.00 |
| 16-20 | $ 18.00 |
| 21-25 | $ 106.00 |
| 26-29 | $ 750.00 |
| 30-34 | $ 3375.00 |
| 35-37 | $ 7500.00 |

FIG. 14

| ACTIVITY | WEIGHTING |
|---|---|
| HUNTING | DIFFERENT GAME ANIMALS WEIGHTED DIFFERENTLY. |
| SHUFFLEBOARD | DIFFERENT SHUFFLEBOARD AREAS WEIGHTED DIFFERENTLY. |
| POOL | CERTAIN SHOTS (PLAYER PICKS), POCKETS (GAME DRAWS) OR MADE SHOTS (MATCHES) WEIGHTED DIFFERENTLY THAN OTHERS. |
| SKI JUMP DOWNHILL / SLALOM SKI | LONGER JUMPS WORTH MORE, SHORTER FINISHING TIMES WORTH MORE. RECORD BREAKING RUN COULD LEAD TO BONUS. |
| EQUESTRIAN RIDING / DOG JUMPING | HIGHER JUMPS OR SHORTER FINISHING TIMES LEAD TO MORE POINTS OR HIGHER PERCENTAGE. |
| FOOTBALL | LONGER YARDS LEAD TO MORE POINTS/ HIGHER PERCENTAGE. |
| BASEBALL | SINGLE, DOUBLE, TRIPLE, HOME RUN OR RUNS BATTED IN EACH WEIGHTED DIFFERENTLY. |
| HOCKEY OR SOCCER | GOALS SEQUENTIALLY WORTH MORE. |

GAMING DEVICE HAVING A GAME WITH SEQUENTIAL DISPLAY OF NUMBERS

CROSS REFERENCE TO RELATED APPLICATIONS

This application relates to the following co-pending, commonly owned applications: "GAMING DEVICE HAVING FREE GAME KENO," Ser. No. 10/243,051; "CENTRAL DETERMINATION SYSTEM WITH A KENO GAME," Ser. No. 10/601,482; "GAMING DEVICE HAVING MATCHING GAME WITH IMPROVED DISPLAY," Ser. No. 10/953,430; and "GAMING DEVICE HAVING A WAGERING GAME WHEREIN A WAGER AMOUNT IS AUTOMATICALLY DETERMINED BASED ON A QUANTITY OF PLAYER SELECTIONS," Ser. No. 11/011,810.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to wagering gaming devices. More particularly, the present invention relates to variations to Keno, Lotto and Bingo games for wagering gaming machines.

Although the present invention is applicable to Keno, Bingo and Lotto, for ease of illustration, the invention is described mainly in connection with Keno and in particular gaming devices such as Video Keno games. Keno in the U.S. traces back to a game brought to the United States by Chinese immigrants in the 1800's. The Chinese game used a board and a set of up to one hundred twenty characters instead of numbers. Early versions of American Keno used characters on the Keno ticket, rather than the numbers used today. The American game dropped the number of characters to the more familiar eighty.

When gambling was legalized in the state of Nevada in 1931, the "Chinese lottery" game was referred to instead as Horse Race Keno, referring to the idea that the numbers are horses and the player wants the wagered horse to come in. Later, the name was shortened to simply Keno, although the game is still referred to often as Horse Race Keno.

Keno is similar to a lottery game. The goal, like a lottery, is to choose a winning number or numbers from a plurality of numbers. In most versions of Keno, the gaming machine displays or the player receives a card with eighty squares numbered one to eighty, arranged in rows of ten. The player can bet on any number or numbers, up to fifteen numbers, which the player does by marking selected numbers on a Keno card. In the video version, the player selects the numbers such as by touching a touch screen. In a paper version, a clerk records the player's bet(s), wherein the player pays for each number played or wagered.

In the paper version, the Keno numbers also appear on eighty ping pong type balls, which can be tossed about in a clear plastic sphere, spun around in a wire bird cage or mixed in other suitable apparatus. Keno numbers were at one time drawn using a manually powered Keno goose. Later, a number of different lottery styles were used. Today, in the paper version and in the video version Keno numbers are generally generated via computers using random number generators. When a number is chosen, the number is shown electronically on Keno boards throughout the casino or on the video monitor.

For the paper version, a number of Keno outlets and Keno monitors are typically placed in various places around a casino or gaming establishment. In certain types of Keno, the player must return a winning ticket to the Keno ticket writer before the next game starts (usually about five minutes) or forfeit the win. Other types of Keno allow the player additional time.

Many casinos offer "multi-race" cards, which allow the player to play the same set of numbers over multiple games. One type of "multi" game allows the player to wager a single set of numbers over as many as twenty games. When finished, the player must return to the Keno station and cash in any wins. "Stray and play" tickets are also available, which allow the player to play a version of Keno called "walk away Keno." Here, players can purchase a Keno ticket for an extended number of games, enjoy other activities in the casino and return at a later time or even a later date to have the tickets checked by a computer for winning games.

Another option for Keno players is a combination or "way" ticket. A combination ticket enables the player to group different numbers, wherein each group has the same amount numbers, creating more than one way to win. For example, a 3×3×3, nine spot ticket allows the player to select a combination of three groups of three numbers. The player can, for example, mark a first group of three numbers with the letter "A," mark a second group with the letter "B" and mark a third group the letter "C." This ticket enables the player to win on any winning combination of three numbers for any of the three groups. Hitting any winning combination pays as though a single ticket had been played. Essentially, the player plays three games on one card. In some Keno games, playing three numbers in three games enables the player to play, or provides to the player an additional nine spot game.

The "way" ticket supposedly makes Keno more exciting, enabling players to wager more money on more numbers. In reality, playing a way or combination ticket offers no mathematical advantage, and no disadvantage, to the player. Some casinos offer discounted minimum bets with "way" tickets. If the player plays three or more ways, many casinos will discount the price per "way" (e.g., let the player bet $0.50 per wager instead of a usual $1 minimum). The casino however only pays back on the player's actual bet.

Certain variations of Keno have expected returns that are relatively constant regardless of how many numbers the player plays. That is, it does not mathematically matter how many numbers the player chooses or if the player combines wagers. The player can choose less numbers if the player likes to win a smaller amount but a little more often. The player can choose more numbers if the player does not care about the frequency of the wins but wants bigger payouts. In other versions, the expected value fluctuates based on how many numbers the player plays.

Keno has been embodied in various types of gaming devices. While Keno is relatively popular in video format, a need exists to provide variations of Keno to players to make the play of both the video and casino versions of Keno more enjoyable, fun and exciting. In particular, there is a need to increase the fun and excitement associated with the sequential display of numbering such as for the games of Keno, Lotto and Bingo.

SUMMARY OF THE INVENTION

The present invention provides improved number matching games, such as Keno, Lotto and Bingo, which can be employed in both a gaming device and also in live gaming at a casino.

One embodiment of the present invention involves inverting the display of the game drawn numbers and the player's picks. In known Keno, the player picks numbers, and then the gaming device or house displays a series of drawn numbers to determine an amount of matches if any. In the number matching game of the present invention, the player picks numbers. The game draws its numbers at some time prior to, simultaneously with or after the player picks the player's numbers but before the presentation of the player's picked numbers in one preferred embodiment. In that manner, when the player's numbers are displayed or prescribed, the game also shows whether the player's picks yield a match or not. In the present invention, the reveal of the player's picks reveals whether those picks match a drawn number. This sequence is applicable to Keno, Bingo and Lotto.

In one embodiment, the game simply shows that the player's pick either results in a match or not. For example, the gaming device can display a "hit" or "match" area and a "no hit" or "no match" area. If the player's pick results in a match, the pick is shown in the "match" area. If not, the pick is shown outside the "match" area or in the "no match" area. In this "hit area" embodiment, the gaming device does not need to reveal the game drawn numbers to show the player how many matches the player has obtained. The game in a preferred embodiment does eventually reveal the game drawn numbers that do not match the player's picks to satisfy the player's curiosity and to verify that the remaining drawn numbers are indeed unmatched.

Instead of a hit or match area, the game can provide any suitable visual, audio or audiovisual indication of whether the player's pick results in a match or not. For example, the game could be displayed in the form of a basketball game, wherein the player's picks are illustrated as basketball shots. A pick that results in a match is shown by a made basket. A sound of a "swish" or the ball hitting the net can also be provided. A pick that does not result in a match is shown as a missed shot. The present invention, it should be appreciated, lends itself to being displayed in many different ways, such as via different sporting events.

In another embodiment, at least one game drawn number is displayed before at least one player selected number is displayed. That is, instead of or in addition to the display of the "hit area" or positive game outcome (e.g., made basketball shot), the game displays one or more of the game drawn numbers prior to the display of the player's picks. When the game then displays a player's pick, the player knows instantly whether the pick results in a match.

In an embodiment, each of the game drawn numbers is displayed prior to the display of the player's picks, making it difficult for the player to determine how many matches there are before the display of the player's picks. In an alternative embodiment, the game only displays drawn numbers that yield a match. Numbers not drawn may or may not be revealed.

In one example, after the player picks one or more numbers from a displayed set of numbers, e.g., two to ten numbers from the display of eighty numbers, the game holds the player's picks in a queue and removes the display of the set of numbers. The game at this point or at a time prior to this point generates or draws a number or a plurality of numbers. Again, the game may or may not display the drawn numbers to the player. The game then displays the player selected numbers and whether or not the numbers create a match either via a "hit area", a positive outcome (made basketball shot, home run or touchdown, etc.) or via displaying the game drawn numbers first and matching the player's picks to the drawn numbers.

In the above-described embodiments, the display of the player's picks informs the player whether or not the picks yield one or more matches. The picks can be displayed to the player either all at once, as they are selected or in some other sequential manner.

Either in combination with the above-described embodiments, or otherwise, the number matching game in one embodiment allows the player to buy additional picks. The player for example obtains three picks for a single credit wager, however, the game provides the player with an option to obtain an additional pick for an additional credit up to, for example, ten picks for eight credits wagered. The Keno payout is made per credit wagered, so that a player wagering less is not disadvantaged from a standpoint of odds.

Either in combination with the above-described embodiments, or otherwise, the number matching game of the present invention in various ways assigns different weights to different number matching components. The game weights the game drawn numbers, the player's picks, matched numbers or any combination of these. Numbers are weighted, for example, by attaching different amounts of points to the numbers. The player's award is based on the accumulated points of matched numbers rather than solely on the number of matches.

The game of the present invention can assign: (i) a weight to one, a plurality of or all the player's picks; (ii) a weight to one, a plurality of or all the game drawn numbers; (iii) a weight to one, a plurality of or all of the player's picks and game drawn numbers; or (iv) a weight to one, a plurality of or all the matched numbers. The weighting can take the form of positive or negative points or a percentage of a whole. If points are assigned to both the game drawn numbers and the player's picks, a match can combine the points of the picked and drawn numbers by adding, multiplying or using one or more other suitable mathematics operations.

The game accumulates the points or percentages and uses a paytable to match a point total or a percentage total with an award for the player, if any. In an embodiment, the game accumulates points for matched numbers by either adding points associated with a player pick that results in a match, a game draw that results in a match, a pick and a draw that result in a match or via the match itself.

Certain point values are negative in one embodiment. Negative values can also add excitement to play of the game, wherein the player wishes a different number had been picked. The use of negative points also enables the game to draw many more numbers than in typical number matching games. For example, in Keno the game typically draws twenty numbers. With negative points, the game can draw, e.g., forty of eighty numbers or all eighty numbers because a percentage of the numbers, if matched, will be a detriment to the player. That is, if the pool includes eighty numbers, the game could draw all eighty numbers, yielding as many matches as there are player selections because some matches will yield positive points and some matches yielding negative points.

The weighted game can be displayed in a typical number matching game format or in a variety of other formats. For example, the matching can take place on a video dartboard, where dart throws represent player picks, that either hit a match or miss the dartboard (i.e., combining weighted Keno with inverted Keno described above). Weighted Keno can be displayed as any type of sporting event when combined with inverted Keno, for example, via a display of shuffleboard, hockey, football, baseball, basketball, boxing, racing (e.g., downhill or slalom ski racing, auto racing, horse racing, etc.), billiards or pool, game hunting, etc. Matches result in positive or winning displays, while non-matches result in defeat displays, such as crashes, quarterback sacks, strikeouts, knockouts, etc.

Weighting is dependent on the order numbers are picked or drawn in one embodiment. For example, the first number drawn could yield more points for a match than the next three draws, which in turn yield more points for matches than the next six draws, and so on. Alternatively, the weighted points or percentages are associated with the actual numbers rather than the order in which they are picked. For example, the selection of the number forty-four can yield ten points if resulting in a match, while the selection of the number eighty yields only five points or even negative five points for a match.

In one embodiment, a table is stored in memory that correlates points with respect to an order in which the numbers are drawn. For example, if the game employs a forty-three number draw instead of the usual twenty number draw, the game could provide points for matches as follows: two points for the first eighteen draws, three points for the next twelve draws, five points for the next six draws and seven points for the final draws. The player's award would then be based on a total number of points accumulated. For example, thirty-three or more points would yield 1600 credits, 31 to 32 points would yield 400 credits, 26 to 30 points would yield 55 credits, 22 to 25 points would yield 15 credits, 19 to 21 points would yield 6 credits, 15 to 18 points would yield two credits and no credits would be given for 15 points or less points.

In any of the above-described embodiments and variations thereof, the payouts can be in the form of credits, wherein for example accumulated points or percentages are translated directly to game credits. Alternatively, the payouts are at least partially in the form of a multiplier. For example, accumulated points can correspond to a multiplier that multiples some base number, such as a number of matches between the player's picks and the game draws.

The present invention also includes multiple game draws, wherein one draw determines the actual numbers and another draw determines the weighting of the numbers. For example, in a baseball implementation, one draw determines if a match has occurred, which is displayed as a base hit, while another draw determines whether the base hit is a single, double, triple or home run.

Either in combination with any one, a plurality of or all of the above-described embodiments, the present invention includes bonusing. For example, in addition to awards being provided for a number of matches between the player's picks and the game's draws, points or percentages can be associated with the numbers that accumulate to determine a bonus provided in addition to a base award. For example, one or more or all of the player's picks or one or more or all of the matched numbers can be associated with points that accumulate to a total, wherein the total is compared to a paytable, which determines a bonus award for the player.

In another embodiment, the game makes a separate random generation of numbers for the purpose of determining a bonus. That is, a first draw is used to determine a base award and a second draw is performed to determine a bonus award. The separate draws may or may not be able to each draw the same number. In the case where a number can only be drawn once, the base and bonus draws effect one another because any match can belong to only the base award determination or the bonus determination.

The bonus award is determined in one embodiment using a paytable that correlates the accumulated points or percentage to a desired type of award, such as a number of credits, a multiplier, a number of free games (e.g., free number matching games or plays of a second game associated with the gaming device), contribution towards a bonus or progressive pool, fever or scatter pays, etc. Otherwise, the accumulated number can be associated directly with a number of credits or a multiplier number, etc. (e.g., accumulation of twenty-five points yields a bonus of twenty-five credits or a multiplier of 25×).

In another embodiment, the bonus is associated with certain drawn or picked numbers, which if matched, provide a bonus. For example, the number ten if matched yields a bonus such as: (i) counting the match twice instead of once, (ii) a multiplier or (iii) a number of credits. In a further embodiment, the bonus is associated with an order that a number is picked or an order drawn. For example, a multiplier can be associated with a match occurring on the player's first pick, last pick, etc.

In certain embodiments, the number matching games of the present invention are provided in video format on a gaming device. The number matching games can be provided independently or in combination with other types of games, such as slot, poker, blackjack, craps, bingo, etc., wherein an outcome in the number matching game can be used in the other game and vice versa. In any case, the gaming device can be controlled: (i) by a processor provided therein; (ii) over a local area network in the gaming establishment; or (iii) over another type of data network such a wide area network or an internet.

Certain of the above-described embodiments can be provided in live casino gaming. For example, the weighted number matching embodiments can be provided in live gaming. When a number matching number is drawn, a number of points or percentage can also be generated or otherwise associated with the drawn number. Alternatively, points or a percentage can be assigned randomly to the player's picks on the player's ticket, for example, at the time of redemption.

The bonus draws can also be performed via live gaming, through separate draws for example. The bonus can also be determined at the time the player redeems a ticket, for example a Keno ticket, based on the number of matches, the numbers picked by the player or an order in which a match has occurred.

It is therefore an advantage of the present invention to provide fun and exciting Keno, Bingo and Lotto displays.

Another advantage of the present invention is more fun and exciting Keno, Bingo and Lotto games.

A further advantage of the present invention is to provide a more entertaining presentation of a sequential display of whether or not a player's picks result in award winning matches.

A further advantage of the present invention is to provide flexibility to the display of Keno, Bingo and Lotto type games.

Another advantage of the present invention is to provide weighted systems and methods for determining a Keno award.

Another advantage of the present invention is to use a point system in connection with Keno, Lotto or Bingo to allow for more player hits, while maintaining a reasonably profitable game.

A further advantage of the present invention is to provide Keno, Bingo and Lotto games having bonusing.

A further advantage of the present invention is to have increased control over the win frequency and prize profile for a Keno, Lotto or Bingo game.

Moreover, an advantage of the present invention is to provide fun and exciting Keno, Bingo and Lotto games that may be implemented in a gaming device or via a table game.

A further advantage of the present invention is to reduce the amount of numbers necessary to show sequentially whether the player's picks result in matches, and to increase the animation time for each number presented.

Additional features and advantages of the present invention are described in, and will be apparent from, the following Detailed Description of the Invention and the figures.

BRIEF DESCRIPTION OF THE FIGURES

FIG. 8 is a non-inclusive chart of other examples of activities that can be used to operate Keno, Lotto or Bingo-type games of FIGS. 5A to 7B.

FIG. 10 is a non-inclusive chart of various types of activities that can be used to operate with the games of FIG. 5C.

FIG. 14 illustrates a non-inclusive chart of different activities that can be used in operation with a Keno, Lotto or Bingo-type game that assigns points or percentages to either a game drawn number, a player's pick or a match to weight various matches.

DETAILED DESCRIPTION OF THE INVENTION

Figure 1:
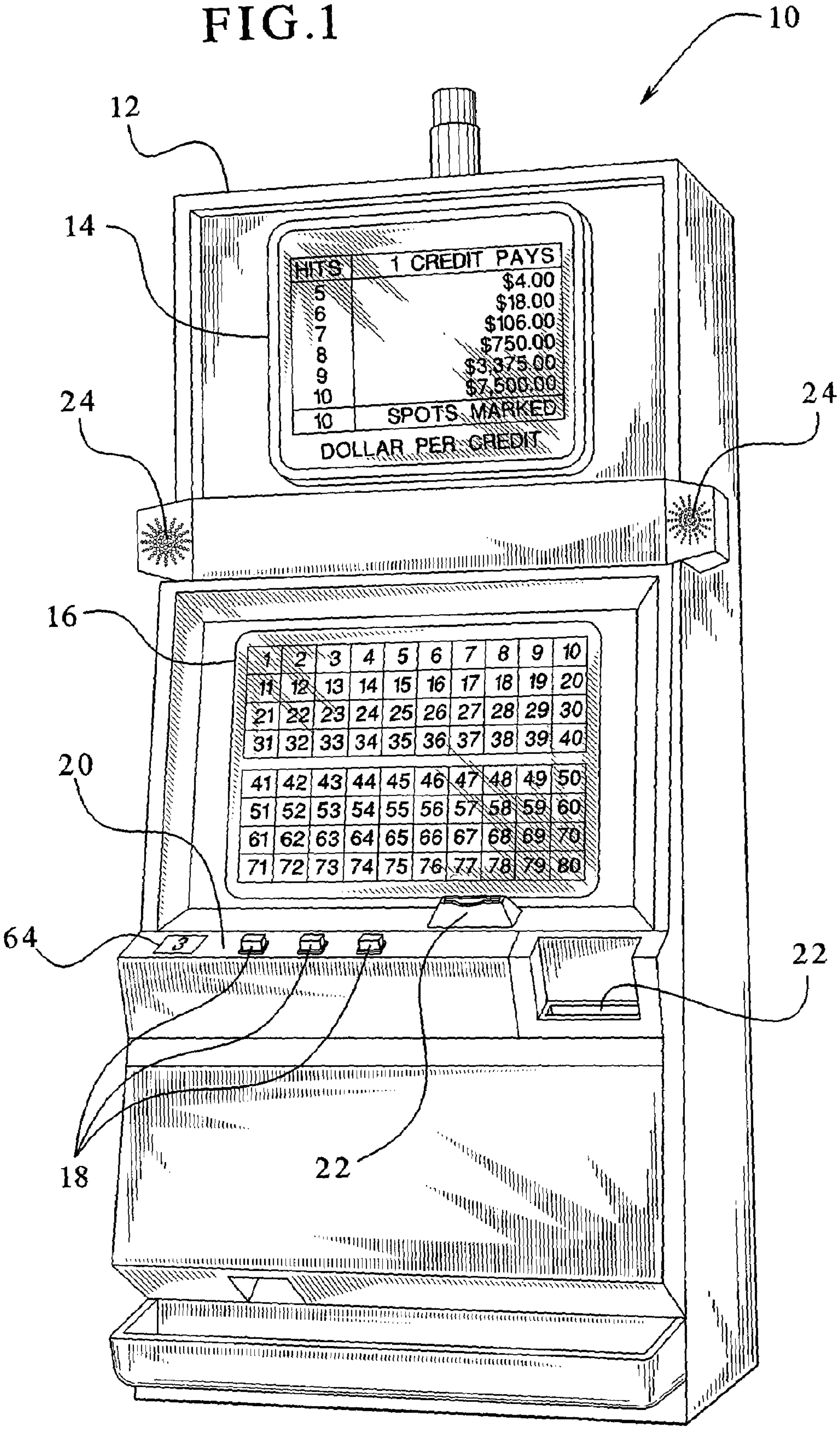
FIG. 1 is a perspective view of a gaming device incorporating the Keno, Lotto or Bingo game of the present invention.

Referring now to FIG. 1, each of the embodiments described herein is provided in one preferred embodiment in a gaming device 10. Alternatively, certain embodiments are provided on various monitors throughout a casino or gaming establishment. Gaming device 10 is in one embodiment a video gaming device and includes a cabinet 12 having at least one video monitor. The illustrated embodiment includes two video monitors 14 and 16. Cabinet 12 is illustrated as being of a type where the player stands or sits. The cabinet is alternatively a bar top cabinet, wherein the player sits to play the Keno, Lotto or Bingo game of the present invention. While the present invention is applicable to any wagering game that displays numbers sequentially to show whether or how much the player wins, such as Keno, Bingo and Lotto, the description of the gaming device 10, for simplicity, is mainly directed to Keno.

The cabinet 12 also provides controls for a player to operate gaming device 10. In the illustrated embodiment, various electromechanical input devices 18 are provided on a tilted portion 20 of the cabinet 12, below video monitors 14 and 16. Electromechanical input devices 18 each send a discrete signal to a microprocessor (described further below) located within cabinet 12. Those input devices enable the player to perform the various Keno functions, including but not limited to, selecting at least one of the Keno numbers, playing "ways" or multiple games at once, wagering a number of credits per game or "way" and cashing out. The input devices 18 also enable the player to play multiple Keno games in a row, analogous to the "multi-run" or "stray and play" Keno tickets offered by the casino.

Similar to the electromechanical input devices 18, cabinet 12 of gaming device 10 can provide electromechanical displays that show, for example, the player's credits maintained within gaming device 10, the number of Keno numbers played, the bet per game, etc. In one preferred embodiment, however, these functions as well as others are provided on one or more video monitor or display devices 14 and 16. In the illustrated embodiment, display device 14 shows the pays for a number of hits or matches between the numbers that the player selects and the numbers that gaming device 10 generates. Displays 14 and 16 can also inform the player of the rules concerning the operation of one or more or all of the embodiments of the present invention.

Video monitor 16 displays, without limitation: (i) the Keno numbers randomly generated by gaming device 10; (ii) the numbers played by the player; (iii) the number of "ways" or simultaneous games played by the player, and the numbers selected by the player for each "way", (iv) the wager per game; (v) the player's total wager; and (vi) the player's Keno award, if any. In one embodiment, when the player selects or picks a number or the game generates a number, gaming device 10 highlights it as a certain color, for example, yellow.

Cabinet 12 of gaming device 10 also includes one or more monetary input devices 22. The monetary input device 22 can accept coins, cash, a smart card, a credit card, a debit card, a casino card or other type of gaming device card. Keno gaming device 10 can also include a ticket reader and a ticket printer (not illustrated) that enables the player to input and receive a redeemable ticket in lieu of cash. The ticket reader/validator and printer operate with the processor housed inside gaming device 10.

Figure 2:
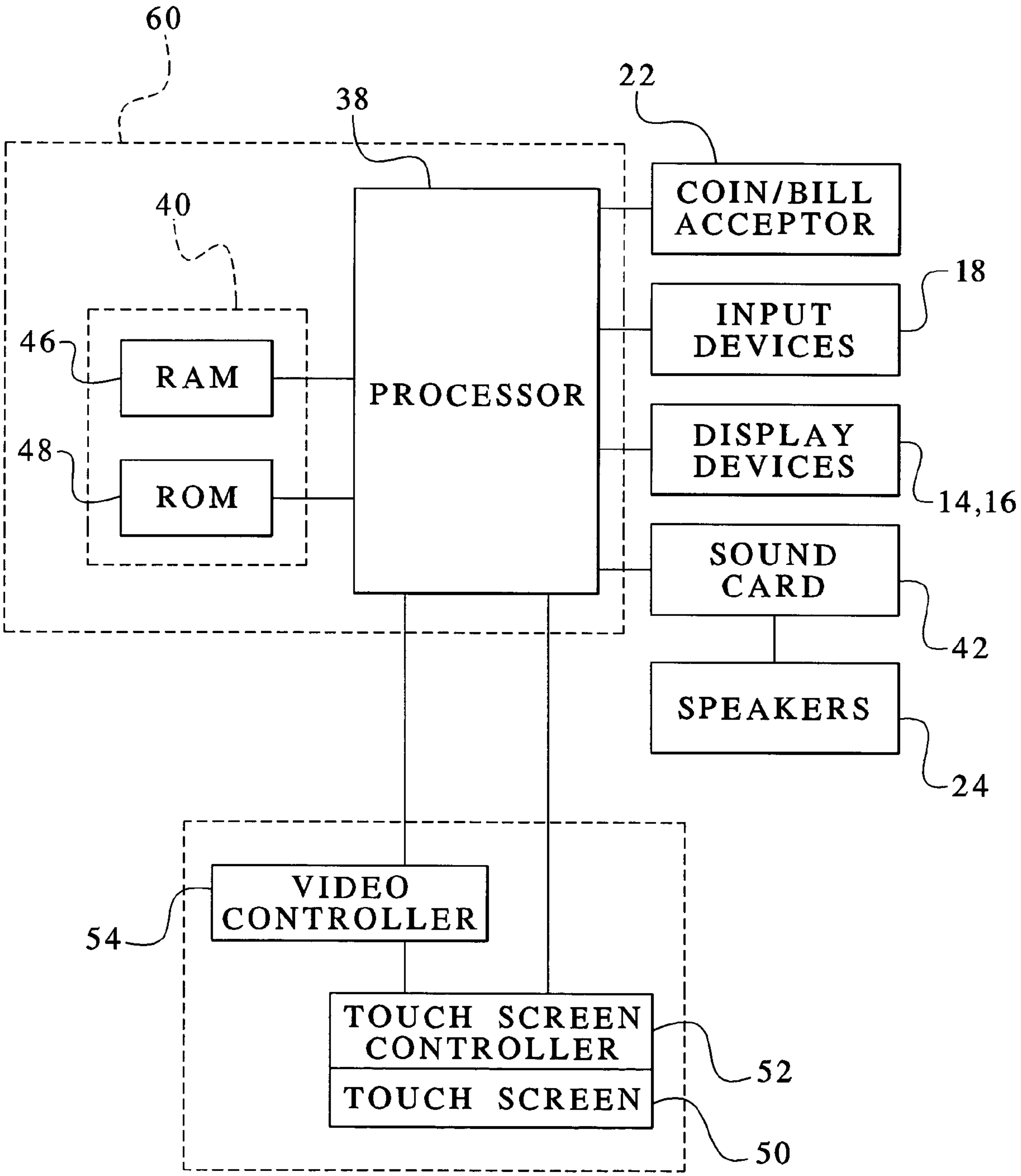
FIG. 2 is an electrical schematic for one embodiment of a gaming device having the Keno, Lotto, or Bingo game of the present invention.

Referring now to FIG. 2, gaming device 10 is run by a processor or central processing unit ("CPU") 38 and a memory device 40 that operates with one or more display devices 14 and 16 that display the generated Keno numbers. Processor 38 is in one embodiment a microprocessor and has a microcontroller-based platform. The memory device 40 includes random access memory ("RAM") 46 and read only memory ("ROM") 48. The platform for the processor 38 and memory device 40 is located variously: (i) inside gaming device 10; or (ii) as stand alone components in the casino, part of a server/client system, data network, one or more application-specific integrated circuits (ASIC's) or one or more hard-wired devices.

Gaming device 10 can house its own gaming program or be linked in a client/server manner via a data network 60, wherein the present invention provides some or all of the functions of the processor and memory device at a central location, such as a network server for communication to a playing station over a local area network (LAN), wide area network (WAN), Internet connection, microwave link and the like.

Gaming device 10 provides one or more electromechanical input device 18 and/or simulated input devices. The simulated input devices are provided by a touch screen 50 that operates via a touch screen controller 52 and a video controller 54 with the processor 38. The input devices (mechanical or virtual) enable the player to operate the Keno gaming device 10 of the present invention. One of the video monitors 14 and 16 and possibly, additionally the speakers 24 are used to explain the operation of and perform the Keno games of the present invention. Cabinet 12 of gaming device 10 also provides a number of speakers 24 that operate via a soundcard 42 with processor 38 to inform the player of any type of output, outcome or audio instruction of gaming device 10.

Gaming device 10 in one embodiment operates the Keno game of the present invention as well as another game, such as slot, poker, blackjack, craps or other video wagering game. In one embodiment, the Keno game is displayed on one video monitor 14, while the second game is displayed on the second video monitor 16 or vice versa. Besides providing the Keno games of the present invention, any of the embodiments described herein can be additionally coupled with the one or more games, such as slot, poker, blackjack, craps, bingo, etc. To that end, either monitor 14 or 16 may provide a menu or selections (or same may be electromechanical) that enables the player to choose to play a game from a plurality of different games such as Keno, Lotto, Bingo, slot, poker, blackjack, craps, etc. The Keno game pays out in tokens or coins in one embodiment but can additionally or alternatively payout non-monetary awards or bonus award, such as free games, a casino beverage or meal, a number of selections from a prize pool, etc.

The number matching game of the present invention, whether provided in gaming device 10 or as a casino game, can include any suitable variation of the game. For Keno, the game is illustrated in combination with the variation sometimes referred to as "horse race" or Nevada Keno. In that Keno game, one or more players play against the house. A typical Keno game includes eighty different numbers from which the player chooses. With gaming device 10, the player picks numbers via electromechanical input devices 18 or via touch screen 50. In the casino version, the player circles or marks one or more numbers on a casino card. The player decides which and how many numbers to select or pick, usually anywhere from one to fifteen numbers in casino play and one to ten numbers for play on gaming device 10.

As stated above, certain embodiments of the present invention, such as weighted Keno and the Keno bonusing described below can be implemented alternatively as a live casino game. In the casino version, the player brings a marked card to a Keno clerk. The clerk records the player's numbers and issues a receipt to the player. The player finds a Keno monitor and watches the numbers being posted as they are chosen. As the player watches the generation of the Keno numbers, the player marks the generated numbers on the card. For an eighty number game of Keno, twenty numbers for example are generated. Either the player's numbers or the game generated numbers may be weighted as described below, wherein the house pays the player based on points or percentages accumulated for example based on matched numbers. Also, the house may from time to time designate a drawn number as a bonus number and provide the player a bonus if the player has picked a matching number.

Figure 3:
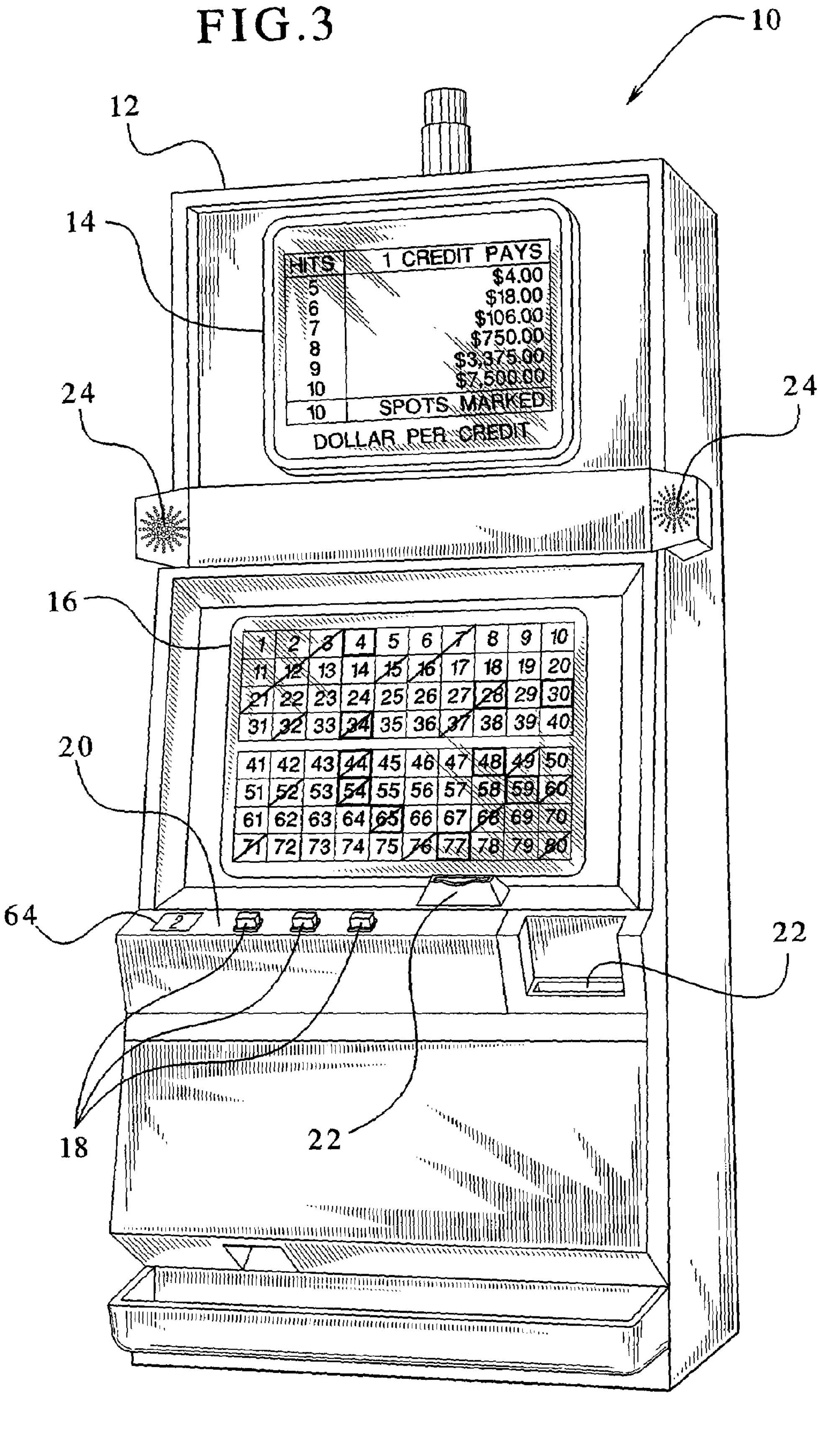
FIGS. 3 and 4 are perspective views of a gaming device having known Keno game displays.

FIGS. 1 and 3 illustrate an operation of a known Keno game. FIG. 1 illustrates a fresh screen on the second video monitor 16 with eighty numbers as they appear before the player has made any picks and before the game has shown any drawn numbers. FIG. 3 illustrates the same screen 16 with a completed Keno game. In this example, the player has pressed one of the electromechanical pushbuttons 18 or has touched the touch screen 50 that operates with display device 16 to select or pick ten numbers 4, 28, 30, 34, 44, 48, 54, 59, 65 and 77. Alternatively, the player presses an input that autopicks numbers for the player. The term "player's picks" and "selected player picks" expressly include the player's selection of individual numbers as well the generation of picks for the player via the autopicks function. The player's picks are shown in FIG. 3 as bolded and bordered. In the example illustrated, gaming device 10 has randomly generated or drawn twenty numbers 3, 7, 12, 15, 16, 21, 28, 32, 34, 37, 44, 49, 52, 54, 60, 65, 68, 71, 76 and 80. The drawn numbers have a slash-through.

There are five matches shown in FIG. 3, namely, numbers 28, 34, 44, 54 and 65 (bearing both markings). According to the paytable displayed in display device 14, gaming device 10 pays $4.00 on a one dollar bet for five matches or hits, in this case for ten player picks. Keno payouts can vary. For example, if the player picks five numbers, the Keno game can require that the random generation device draw two of those five numbers for the player to receive any award or three of those five numbers for the player to receive any award. If the Keno game draws for example three matches, the Keno game can pay the player back at three to one, 2.5 to one, 3.5 to one, etc.

Figure 4:
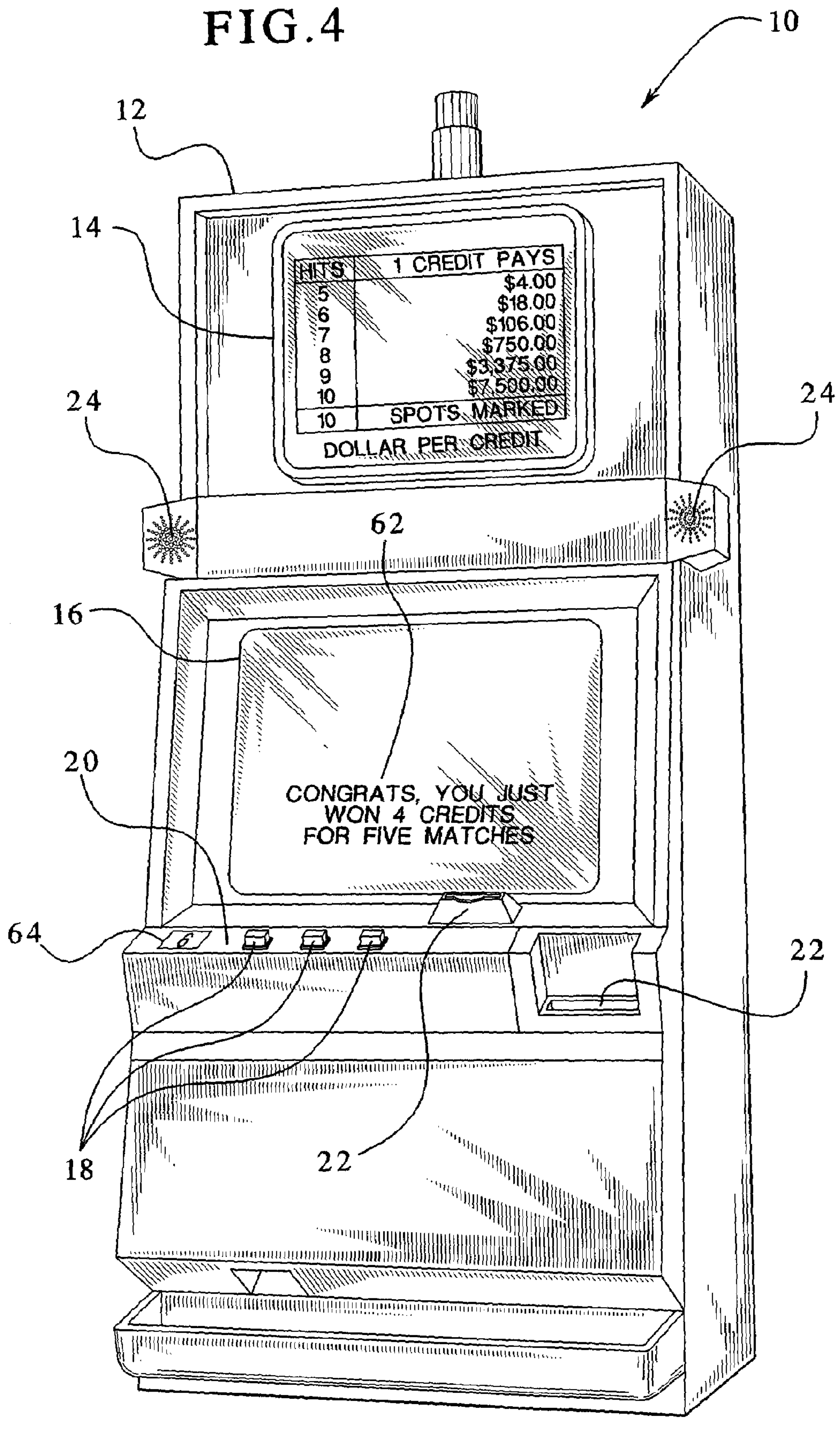

In known Keno, an equal weight is assigned to each number picked by the player and each number drawn by the Keno game. The number of matches determines the player's award independent of which numbers are matched. The award, if any, depends on the percentage of the player's picks that are also generated randomly by gaming device 10 or the house. In FIG. 1, for example, the player starts with three credits as seen in credit meter 64. The game costs one dollar to play. FIG. 3 illustrates that the player has played one game, decreasing the player's credits to two as seen in credit meter 64. FIG. 4 illustrates via message 62 and credit meter 64 that gaming device 10 in known Keno has paid the player four credits for obtaining five matches, increasing the total to six. Likewise in known casino play, if the player has enough matches to claim a winning ticket, which depends on how many numbers the player has selected, the player returns to the Keno clerk to redeem the winning ticket.

Inverted Number Matching Game

Figure 5A:
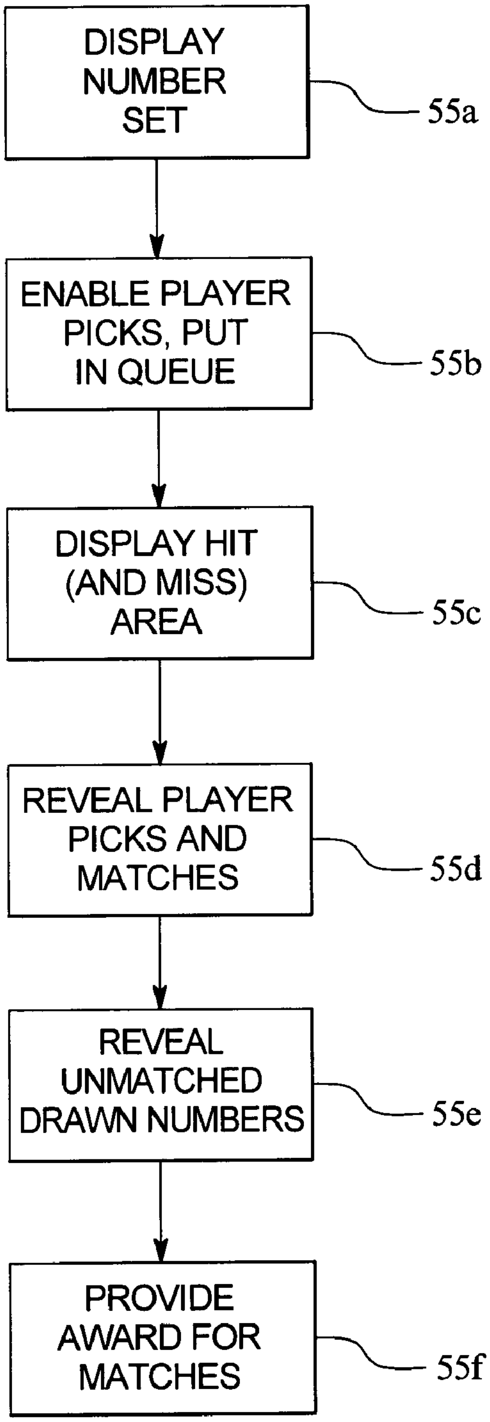
FIGS. 5A, 5B and 5C are schematic flow diagrams setting forth various Keno embodiments for displaying a player's pick and simultaneously displaying whether the pick results in a match.
Figure 5B:
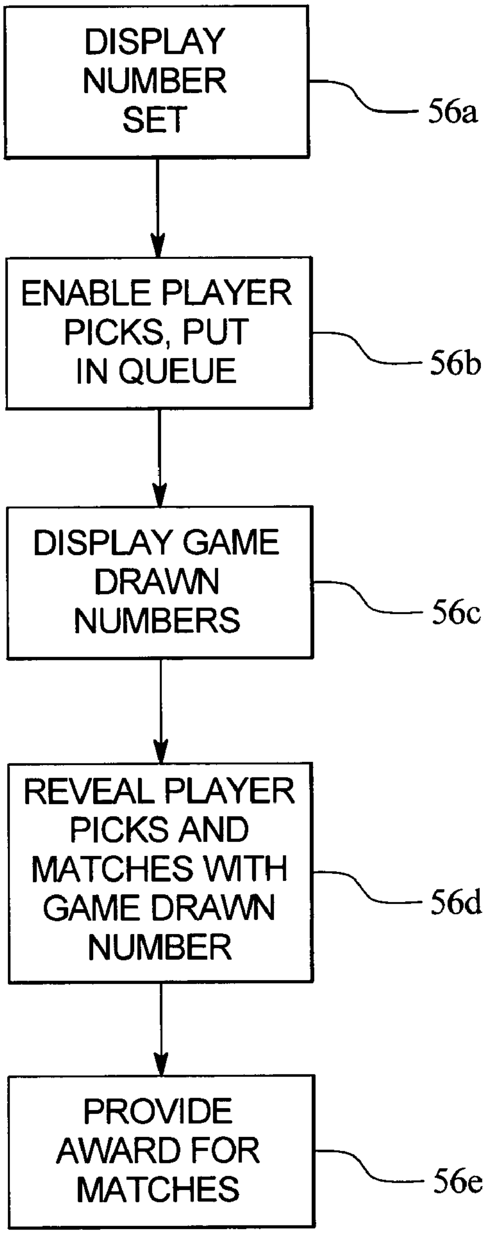
Figure 5C:
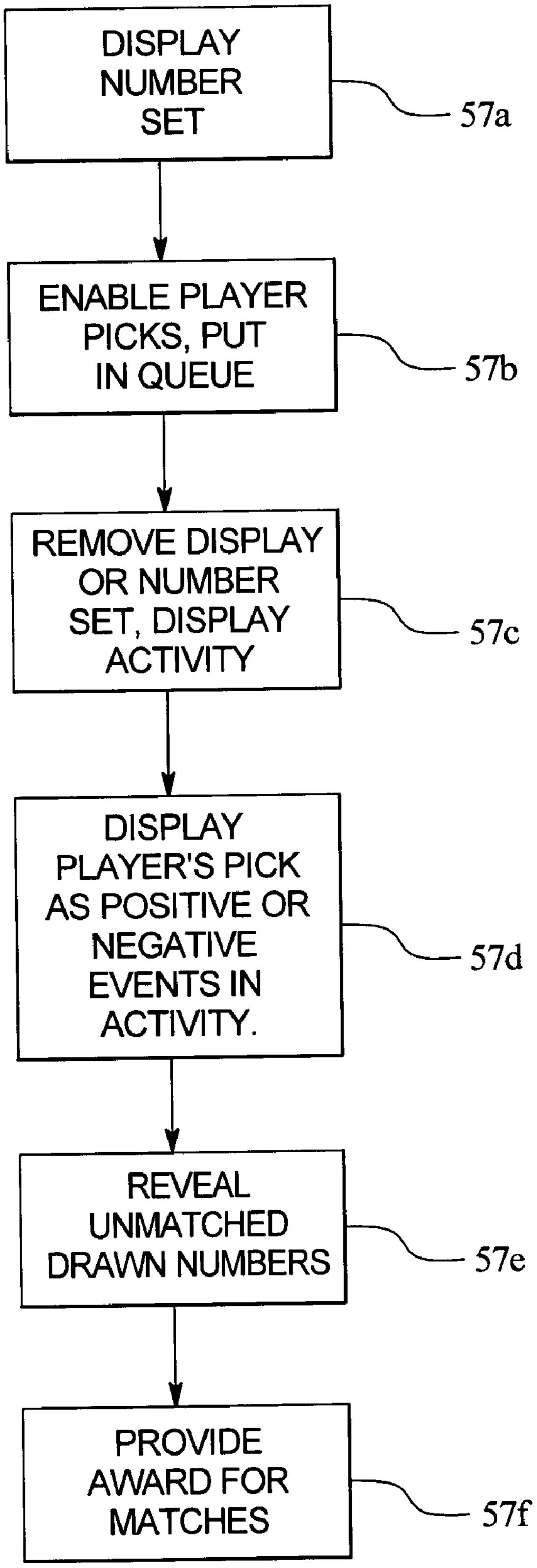

Referring now to the flowcharts in FIGS. 5A to 5C, various embodiments for the inverted number matching game of the present invention are illustrated schematically. FIG. 5A illustrates one embodiment, wherein gaming device 10 displays a "hit" or "match" area. As indicated by block 55*a*, gaming device 10 displays a set of numbers from which a player can choose, such as the set of eighty numbers illustrated in FIG. 1. As indicated by block 55*b*, gaming device 10 then enables the player to pick up to a certain amount of the numbers from the set. Gaming device 10 queues the player's picks, removes the display of the set and displays a "hit" or "match" area as indicated by block 55*c*. In alternative embodiments a "miss" area is either the area outside of the "hit" area or a separate and distinct area. In other embodiments described below, "hit" and "miss" are not associated with areas but instead with other types of outcomes such as success or failure outcomes.

Next, as illustrated in more detail below, gaming device 10 reveals the player's picks sequentially, simultaneously or in groups in either the "hit" or "miss" area, as indicated by block 55*d*. Such display indicates a number of matches if any between the player's picks and the game's draws. Gaming device 10 alternatively reveals additionally the unmatched game drawn numbers (matched drawn numbers are the player's picks in the "hit" area), as indicated by block 55*e*. Gaming device 10 provides an award to the player, if any, based on a number of matches between the player's picks and the game's draws, as indicated by block 55*f*.

The game of FIG. 5B operates slightly differently. As indicated by block 56*a*, gaming device 10 displays a set of numbers from which a player can choose. As indicated by block 56*b*, gaming device 10 then enables the player to pick up to a certain amount of the numbers from the set and queues the player's picks. Gaming device 10 removes the display of the set and displays the game drawn numbers, as indicated by block 56*c*. The game in one embodiment displays the game drawn numbers in combination with the "hit" and "miss" areas described above.

Next, as illustrated in more detail below, gaming device 10 reveals the player's picks sequentially, simultaneously or in groups as either matching or not matching the game drawn numbers, as indicated by block 56*d*. Gaming device 10 provides an award to the player, if any, based on a number of matches between the player's picks and the game's draws as indicated by block 56*e*.

The game of FIG. 5C illustrates a still different embodiment. As indicated by block 57*a*, gaming device 10 displays a set of numbers from which a player can choose. As indicated by block 57*b*, gaming device 10 then enables the player to pick up to a certain amount of the numbers from the set and queues the player's picks. Gaming device 10 removes the display of the set and displays an activity, as indicated by block 57*c*. As illustrated below the activity can be any type of sporting event or any activity having positive or negative outcomes (e.g., successful or unsuccessful outcomes). The game in one embodiment displays the activity to include "hit" and "miss" areas.

Next, as illustrated in more detail below, gaming device 10 reveals the player's picks sequentially, simultaneously or in groups as either positive or negative (successful or unsuccessful) events in the activity, as indicated by block 57*d*. Positive events signal a match. Negative events signal that the player's pick does not result in a match. Gaming device 10 alternatively reveals additionally the unmatched game drawn numbers, as indicated by block 57*e*. Gaming device 10 provides an award to the player, if any, based on a number of matches between the player's picks and the game's draws, as indicated by block 57*f*.

While the embodiments of FIGS. 5A to 5C are different, each has similarities. Primarily, each displays whether or not the player's pick yields a match upon the display of such player pick.

Referring now to FIGS. 6A to 6D, 7A and 7B, examples of embodiments corresponding to those shown in FIGS. 5A and 5B are illustrated. FIGS. 6A to 6D illustrate screen shots on display device 16 (see FIGS. 1, 3 and 4). Display device 16 displays a wheel or dartboard 70 in FIGS. 6A to 6D. Dartboard 70 is divided into a plurality of wedges 72. Each wedge 72 corresponds to one of the game drawn numbers. In the illustrated embodiment there are twenty game drawn numbers and thus twenty wedges. Example game drawn numbers (same as those in FIG. 3) are shown in phantom indicating that they may be displayed (corresponding to FIG. 5B) or may not be displayed (corresponding to FIG. 5A).

When displaying the game of FIG. 5B, the drawn numbers are shown in a random order. Alternatively, the draws are displayed chronologically or in a numerical order, lowest to highest, etc. The drawn numbers can be introduced all at once, individually or in groups in accordance with a desired game design or theme. The wedges 72 are likewise introduced all at once, individually or in groups.

One method of operating gaming device 10 of the present invention begins with display device 16 showing the entire set of numbers, for example, as laid out in FIG. 1. Gaming device 10 then prompts the player to enter the player's picks, for example, by pressing the desired numbers shown on display device 16. A touch screen 50 sends a signal to processor 38, and gaming device 10 cues or stores the numbers picked by the player but does not show at this moment whether the picked numbers result in a match. In one preferred embodiment, the game draws have not yet been made, so that the matches cannot be determined or displayed. Gaming device 10 designates the player's picks by changing the color or otherwise highlighting the numbers picked (see e.g., bolded and boxed numbers in FIG. 3).

At some time prior to the display of dartboard 70 shown in FIGS. 6A to 6D, gaming device 10 draws randomly (e.g., twenty) numbers from the numbers one to eighty illustrated in FIG. 3. Gaming device 10 can draw its numbers before, during or after the player's picks. In one preferred embodiment, the game draws its numbers after the player's picks. In the illustrated embodiment, gaming device 10 draws twenty numbers, however, gaming device 10 can draw alternatively more or less than twenty numbers.

Figure 6A:
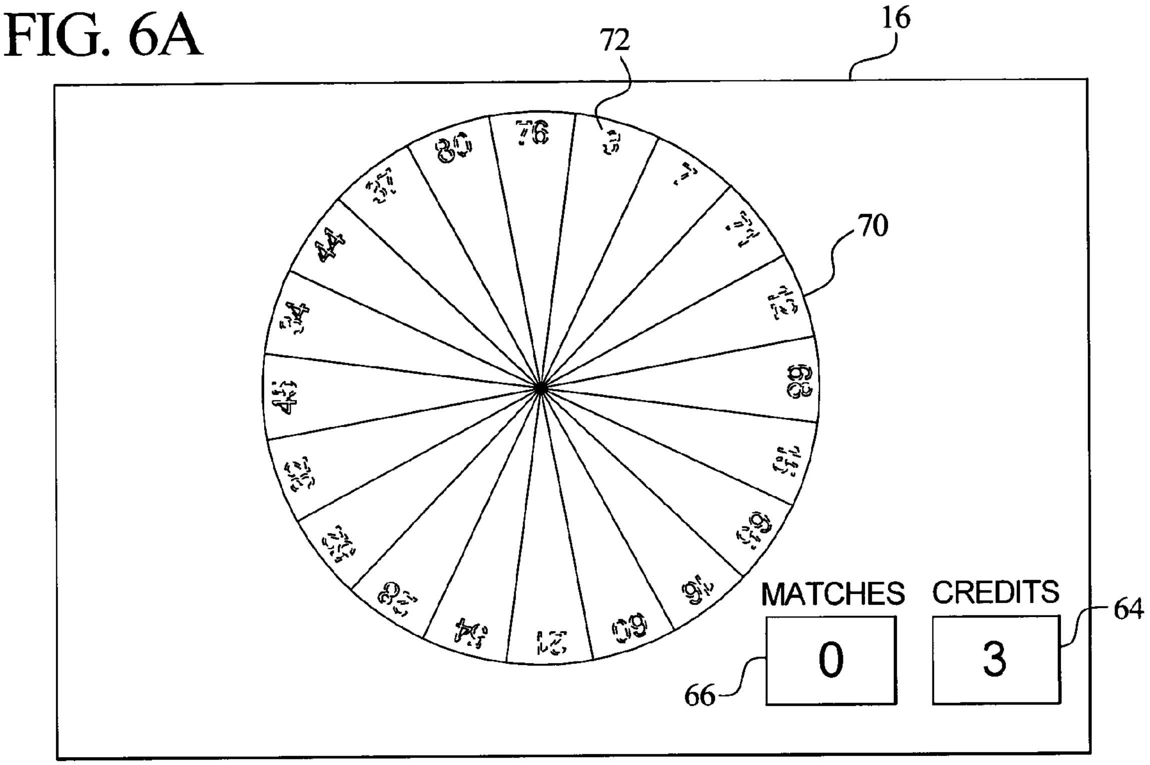
FIGS. 6A, 6B, 6C and 6D are elevation views of one of the display devices of a gaming device having a Keno, Lotto, or Bingo game that illustrates embodiments of games described in connection with FIGS. 5A and 5B.
Figure 6B:
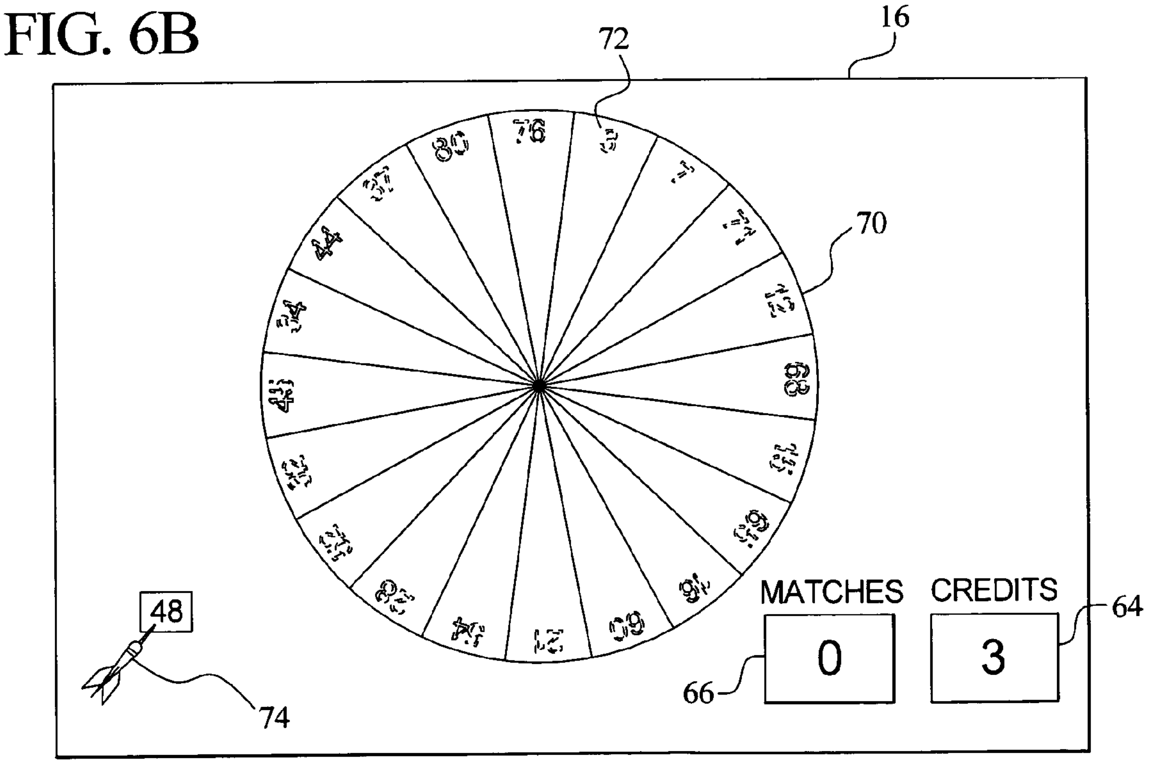
Figure 6C:
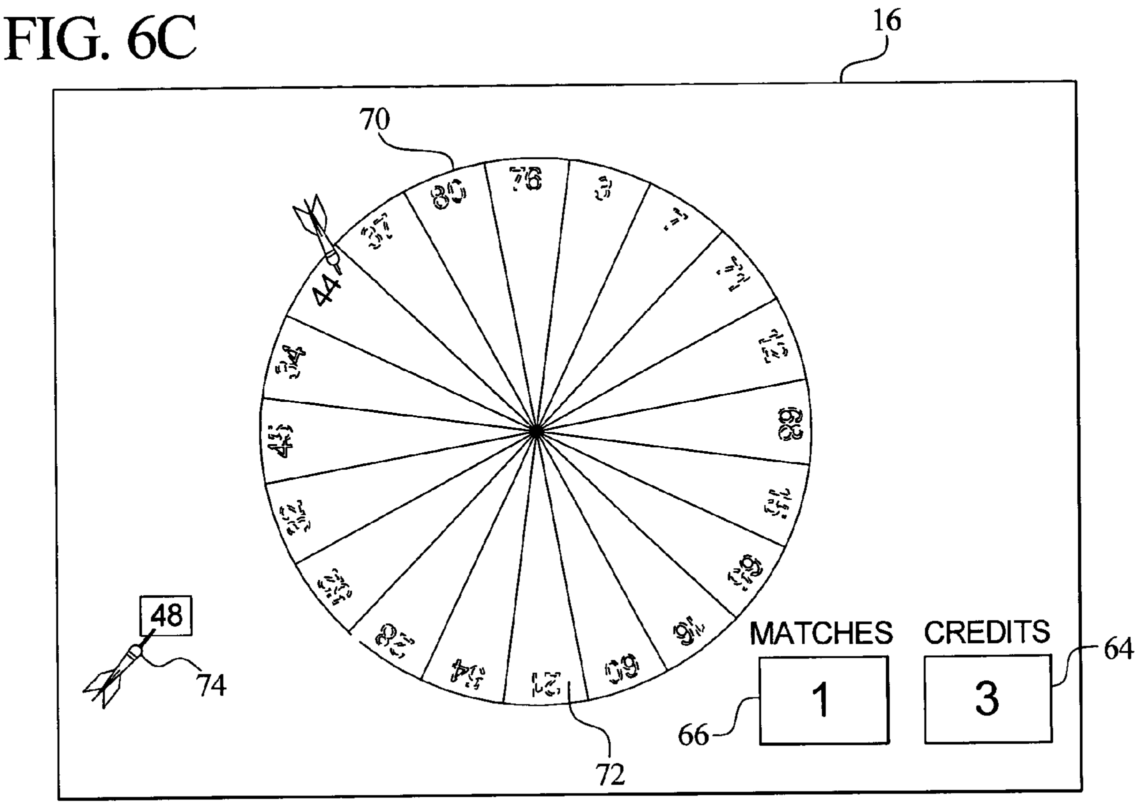
Figure 6D:
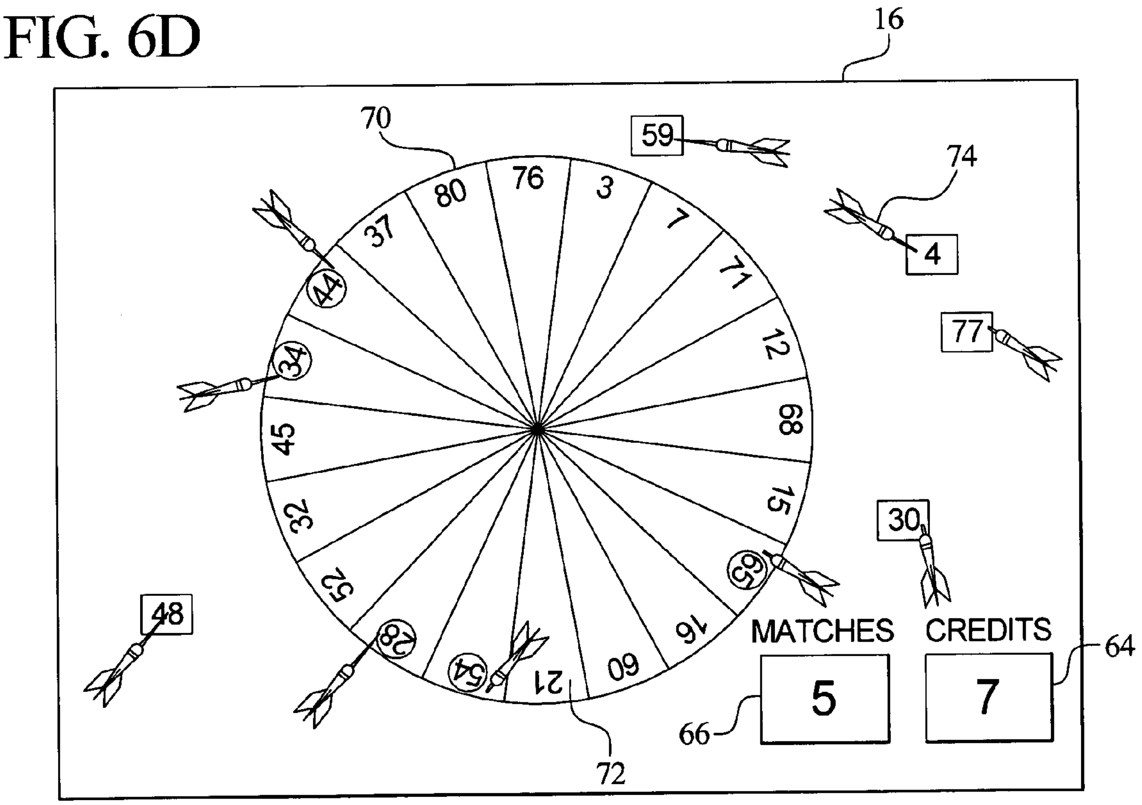

For Keno, after the player picks a desired amount of numbers and gaming device 10 draws its set of numbers, gaming device 10 removes the eighty number display of FIG. 1 and instead of displaying the known Keno generation shown in FIG. 3, displays instead dartboard 70 shown in FIG. 6A. In addition to the dartboard 70, gaming device 10 in an embodiment provides a separate display device or area of display device 16 (not illustrated) that temporarily illustrates the numbers selected by the player, so that the player remembers which numbers have been picked. The picked number display may be more helpful for the embodiments in connection with FIG. 5A where the drawn numbers are not displayed Next, gaming device 10 displays a sequence showing the player's picks as illustrated by FIGS. 6B to 6D. In the illustrated embodiment, the picks are indicated by darts 74. Darts 74 appear and either hit one of the draw numbers, indicating a match, or miss dartboard 70, indicating that processor 38 has not drawn randomly the number picked by the player.

FIG. 6B illustrates a first dart 74 or player pick, namely, pick forty-eight, which is a miss and lands outside of dartboard area 70. A match meter 66 is provided and shows no increment. FIG. 6C illustrates a second dart 74 or player pick, namely, pick forty-four, which is a hit and lands inside of dartboard area 70. In FIG. 6C, the number forty-four is displayed in solid indicating that it is now displayed to the player in connection with both FIGS. 5A and 5B. With FIG. 5B, where the drawn numbers are displayed, the display of the dart 74 indicates that the number forty-eight is a player picked number and a game drawn number. The match meter 66 shows a single increment.

FIG. 6D illustrates display device 16 as it appears after each of the player's picks have been displayed. For convenience and continuity, the same misses and hits as illustrated in FIG. 3 are shown, namely, matches occurring for the player picks 28, 34, 44, 54 and 65 and misses occurring for the player picks 4, 30, 48, 59 and 77. The remaining unmatched drawn numbers are revealed (shown in solid) sequentially, in groups or all at once to show the player the game's selections. Credit meter 64 is updated to show a total of seven credits as seen also in FIG. 4. A match or hits indicator 66 is also provided in an embodiment to show that five matches have occurred. The screen of FIG. 6D or a separate screen (e.g., FIG. 4) is displayed to show the player any award based on the number of accumulated matches.

FIGS. 6A to 6D provide a fun, entertaining, exciting and dynamic depiction of an outcome of a number matching game or a number matching-type game. Importantly, for games relating to FIG. 5A, the outline of the dartboard 70 and wedges 72 ("hit" area) are visible initially, but the corresponding draw numbers are not shown until a dart 74 hits a corresponding wedge 72 or until all player picks or darts have been exhausted The unmatched draw numbers are then revealed to the player in one preferred embodiment. The miss area in FIGS. 6A to 6D is the area outside dartboard or hit area 70. In other embodiments, a separate and discrete "miss" area is provided It is also contemplated not to provide the lines marking the different wedges 72, wherein the circular or otherwise shaped border of dartboard 70 is displayed as the "hit" area and the area residing outside dartboard 70 is a non-hit area. It is also contemplated that one or more wedges 72, i.e., the same area within dartboard 70, houses or corresponds to more than one draw numbers and thus possibly to one or more player picks. That is, there does not have to be a separate wedge 72 or area for each draw number. Furthermore, certain wedges 72 or areas can be provided that do not correspond to any draw number.

It should be appreciated that dartboard 70 can have a multitude of shapes and is not limited to being circular as illustrated in FIGS. 6A to 6D. Further, as shown in more detail below, the player's picks can be represented in a multitude of ways and are not limited to being illustrated as darts 74.

In the embodiments relating to FIG. 5A, the draw numbers are be displayed sequentially as needed until the player's picks are exhausted. In other embodiments, the draw numbers are displayed in subsets or clumps of numbers. In the embodiments of FIG. 5B, all drawn numbers are displayed prior to the player's picks either at once, sequentially or in groups.

In the illustrated embodiments, the draw numbers are displayed to the player as a replacement of the entire set of, e.g., eighty, numbers. The draws are displayed as targets or possible hits. This narrowing of numbers focuses the player to hope that the display of the player's picks shows the picks landing within the match area, e.g., dartboard 70, or landing on or near one of the draws to obtain a match or hit.

Displaying the player's picks sequentially (one to ten numbers typically), as opposed to displaying sequentially the game's draws (usually twenty numbers), can speed up the play of the game. This can allow players to play faster or allow the game designer more time and flexibility to provide more interesting displays, such as the dart game display discussed above. The player, in essence, controls the length of the game by determining how many numbers to play, for example, one to ten numbers.

In one embodiment, gaming device 10 is scaled so that a wager of one credit buys a certain number of picks and a higher wager buys more picks. For example, one credit could buy three player picks, while each additional credit would buy an additional pick of up to ten picks for eight credits wagered The scaling of wagers does not affect the odds of the player winning or the payback percentage when the player is paid on a per credit wagered basis. In Keno, the required number of matches to obtain a payout is scaled typically so that the player has a roughly equal expected value, regardless of the number of picks the player makes. The player wagering more can win more or lose more as the case may be.

Figure 7A:
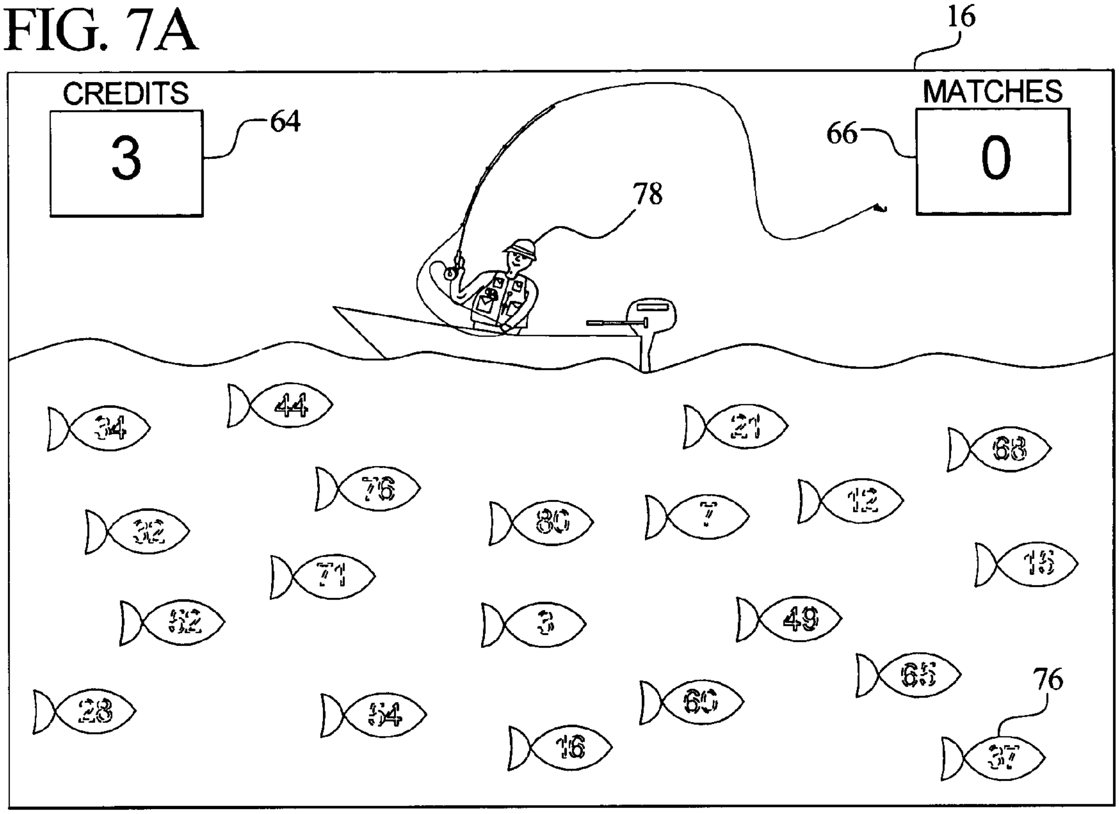
FIGS. 7A and 7B are elevation views of a display device of a gaming device having a Keno, Lotto or Bingo game that illustrates embodiments of games described in connection with FIGS. 5A and 5B.
Figure 7B:
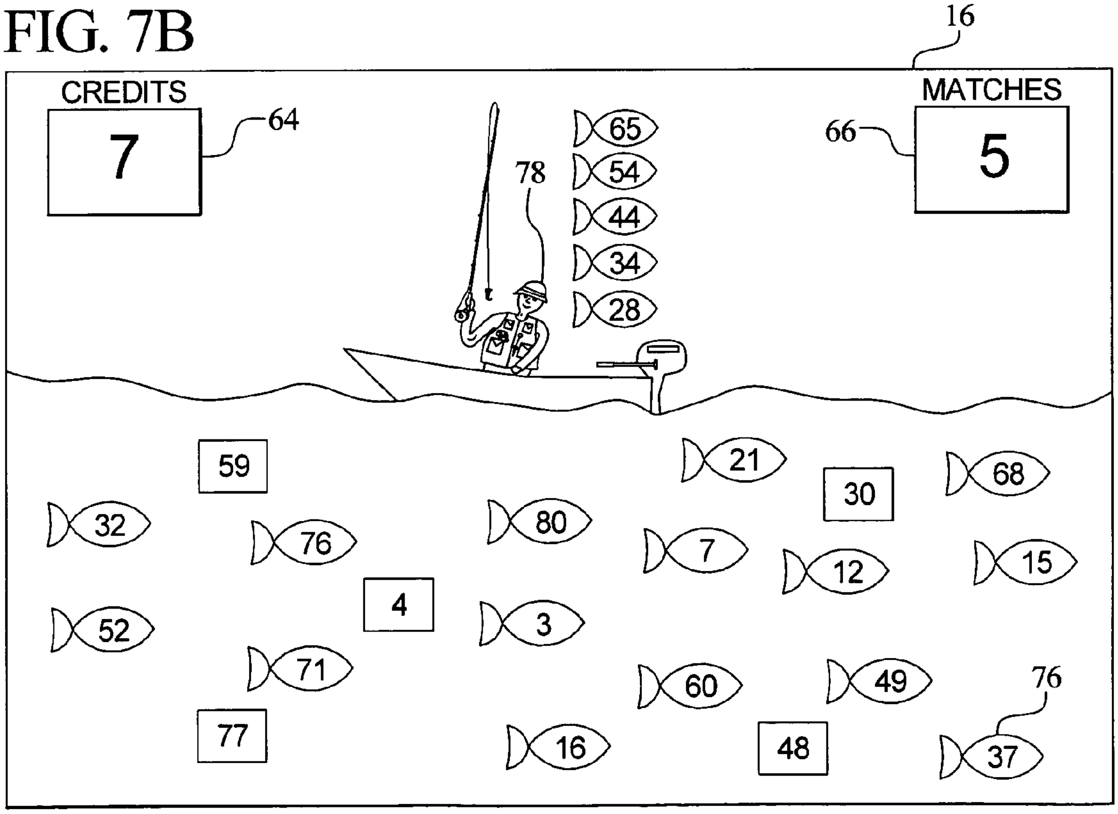

FIGS. 7A and 7B illustrate the games of FIGS. 5A and 5B but instead via a fishing display shown on display device 16. As above, after the player picks a desired amount of numbers from a set of numbers, for example, eighty numbers as shown in FIG. 1. For the game of FIG. 5B, after gaming device 10 draws a random amount of numbers from the set of eighty numbers, gaming device 10 displays the drawn numbers to the player as illustrated (in phantom) in FIG. 7A. For the game of FIG. 5A, display device 16 merely displays the hit areas 76 or fishes.

Multiple hit areas are provided by fish 76, wherein each fish is associated with a single drawn number. In alternative embodiments, the fish can be sized differently, where bigger fish have more associated drawn numbers or sized equally, where certain fish eat or consume different amounts of drawn numbers.

FIGS. 7A and 7B differ from FIGS. 6A and 6B in that there is not a single area, e.g., dartboard 70, in FIGS. 7A and 7B where winning player picks are displayed. Rather, there is a plurality of smaller areas, each corresponding to one or more drawn numbers. Display device 16 in one embodiment shows a fisherman 78 casting a line into the water one time for each player pick. Fisherman 78 pulls each matched fish into the boat and casts to a miss area not having a fish for each miss.

FIG. 7B illustrates the five hits shown in FIG. 3, namely, fish 28, 34, 44, 54 and 65, pulled into the fisherman's boat. FIG. 7B also illustrates five spots, namely, spots 4, 30, 48, 59 and 77 (the remainder of the player's picks), where fisherman 78 has cast the line and missed a fish or hit. The miss areas are again areas outside of hit areas 76.

Any of the embodiments illustrated in connection with FIGS. 6A to 7B can provide bonusing associated with: (i) any of the drawn numbers; (ii) any of the player's picks; and/or (iii) any of the matches. Bonusing is paid out alternatively in a multitude of forms, such as: additional game credits, a multiplier of a base value, a number of picks from a prize pool, a modification of a base game award, a number of additional player selections of the numbers (creating potentially more matches), an amount of additional drawn numbers (creating potentially more matches), a number of free games, an entry into a bonus game, a contribution towards a bonus award or bonus game, a contribution to or an award from a progressive fund, a scatter pay, a fever pay or any combination of these. The bonus is alternatively associated with: (i) drawn numbers regardless if they provide a match; (ii) picked numbers regardless if they require a match; or (iii) a match of drawn and picked numbers. Various bonus embodiments are described below.

It should be appreciated from FIGS. 6A to 7B that there are many different types of visual displays that can be associated with the games associated therewith. FIG. 8 lists briefly the above-described embodiments implemented with other types of activities. The list is not inclusive. Also, each activity listed includes a number of alternative implementations captured by the scope and gist of the present disclosure.

For example, archery, similar to darts and other target games, is displayed in one implementation as a target having (FIG. 5B) or not having (FIG. 5A) the draw numbers displayed. The matches are shown as arrows hitting part of the target, i.e., one of the draws. Misses are shown as arrows missing the target.

In a hunting game, the draws or hit areas are displayed in one implementation as various game animals. The player picks are shots and the matches are hits of a game animal. Misses are the shots missing the targets or hitting some other type of target. With any of the activities illustrated herein, it is possible to have a negative count, e.g., the removal of a match or hit. In game hunting for example, match points can be reduced if one of the player's picks hits a game warden. Alternatively, the count is increased in one embodiment via a randomly generated bonus, shown for example as a hit of an especially illusive target.

The games of FIGS. 6A to 7B are further alternatively implemented in shuffle board, wherein the different shuffle board areas house or contain one or more of the draw numbers. Player's picks are shown when the puck slides. Matches show the player's pick landing in one of the areas. Misses show the player's pick landing outside of the shuffle board award area.

The game of billiards or pool may also be implemented using the methodologies described herein. In one implementation, the targets are different pool pockets, wherein each pocket includes multiple draw numbers. A match is one of the player's picks landing in one of the pockets. A miss is shown by the ball (player pick) missing the pocket. As with any of the implementations, the player can receive a bonus or match count reduction. For example, a bonus is provided for shooting the eight ball into one of the pockets or a match count is subtracted for shooting the cue ball into one of the pockets (i.e., scratching).

The embodiments discussed above in connection with FIGS. 6A to 7B are also implemented in any type of equestrian riding, dog jumping or daredevil jumping display. In one implementation, hit areas (FIG. 5A) or drawn numbers (FIG. 5B) are displayed as jump cites. A single jump site can be used for a multitude of drawn numbers. The player's picks are displayed when the horse (or motorcycle, etc.) jumps. Hits are shown as successful jumps, while misses are shown as unsuccessful jumps or crashes.

Figure 9A:
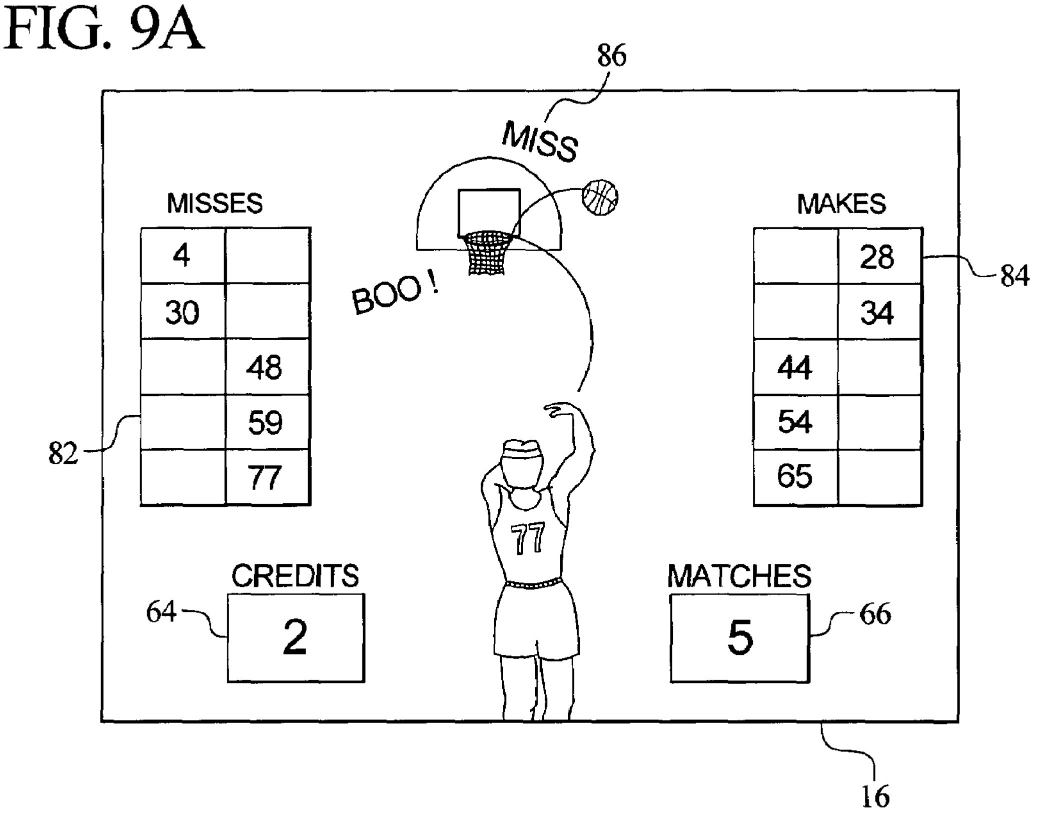
FIGS. 9A and 9B are elevation views of a display device of a gaming device illustrating embodiments of games described in connection with FIG. 5C.
Figure 9B:
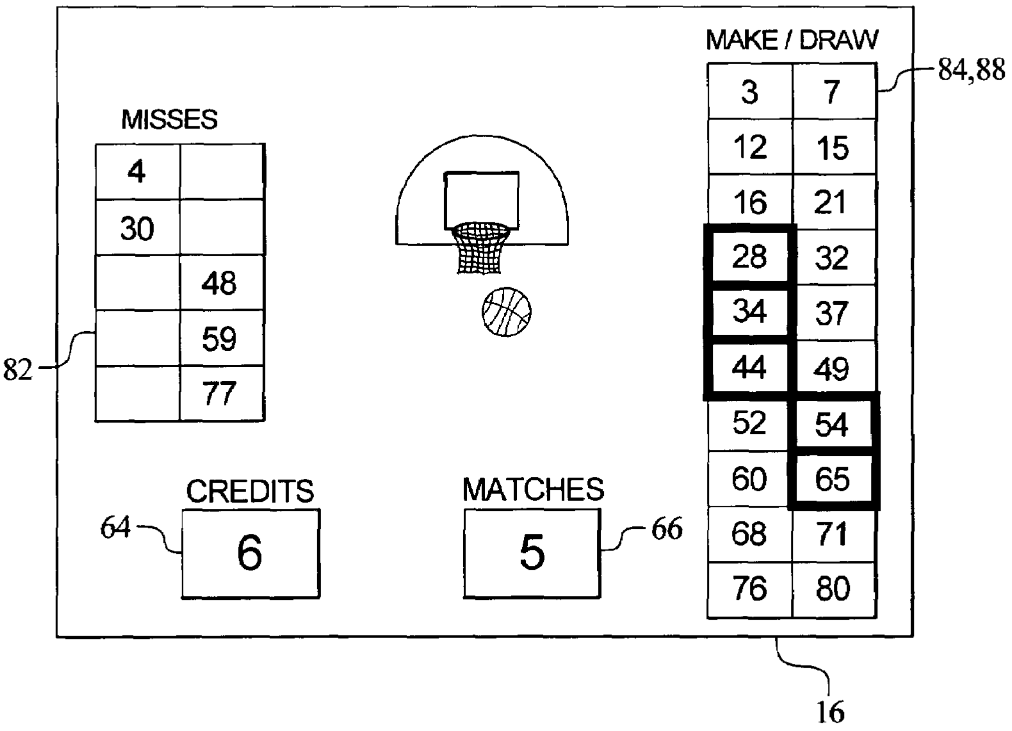

Referring now to FIGS. 9A and 9B, a set of embodiments corresponding to the games of FIG. 5C are illustrated. In the embodiments of FIGS. 9A and 9B, the player as before selects a desired amount of numbers, for example, from the numbers one to eighty as shown in FIG. 1. Prior to showing the display of FIG. 9A on display device 16, gaming device 10 draws randomly an amount of numbers, for example, twenty numbers (before, during or after the player picks numbers). Gaming device 10 then sequentially displays the player's picks in an activity, such as a sporting activity. With the embodiments of FIG. 5C, a hit or match area is not needed necessarily although one may be provided. A match is displayed instead or cooperatively as a successful or positive action.

FIGS. 9A and 9B illustrate a basketball embodiment, wherein a shot by the player represents one of the player's picks (player's picked number seventy-seven displayed as basketball player taking a shot). In the illustrated embodiment, if the player's shot misses the basket, the miss is counted or tallied in a miss area 82. If the player's shot falls through the basket, the picked number is tallied in a make or match area 84. In other words, if the player's pick does not match one of the drawn numbers, the pick is tallied in miss area 82. If the player's pick does match one of the drawn numbers, the pick is tallied in the make area 84. FIG. 9A illustrates a display at the end of the activity showing each of the misses of FIG. 3, namely, the numbers 4, 30, 48, 59 and 77. The make area 84 shows each of the matches of FIG. 3, namely, numbers 28, 34, 44, 54 and 65.

FIG. 9A illustrates the final player pick, namely, the pick of the number 77 shooting and missing a basket. Accordingly, the game is played and the credit meter is lowered to two credits from the three initial credits in FIG. 1. Gaming device 10 provides suitable audio, visual or audio visual indicia 86 confirming to the player whether the shot is made or missed, i.e., whether a match has occurred. Miss area 82 of FIG. 9A shows that player pick 77 does not yield a match.

FIG. 9B shows a reveal sequence that expands the make area 84 into a make/draw area 84, 88. The make/draw area shows all of the hits in the make area 84 of FIG. 9A. The area also reveals each of the remaining drawn numbers to the player, so that the player can verify that the player picks in the miss area 82 indeed do not create a match with the revealed drawn numbers. Gaming device 10 updates the credit display from FIG. 9A to FIG. 9B to six credits in credit meter 64 as is done in FIGS. 3 and 4. Hits meter 66 is also provided to show that the player's picks resulted in five matches.

The embodiments illustrated in FIGS. 9A and 9B are applicable to virtually any activity having a positive or negative outcome or event and can be shown in a multitude of ways for virtually any given activity. FIGS. 6A to 7B involve a target type of game that presents a hit area(s) (FIG. 5A) or drawn numbers (FIG. 5B) to the player. The embodiments of FIGS. 9A and 9B on the other hand do not necessarily involve a target area and instead involve any type of activity that has a successful outcome and an unsuccessful outcome. It should be appreciated that the embodiments in FIGS. 9A and 9B are not limited to the play of basketball and can additionally have hit and miss areas, such as the basket in FIGS. 9A and 9B. One difference with the embodiments of FIG. 5C is that a single "hit" area, e.g., the basket is useable with each of the player's picks. This expands the range of possible activities from target games that tend to provide a separate area for each player pick.

FIG. 10 illustrates merely some examples of activities that can be displayed using the embodiments of FIGS. 9A and 9B. For example, in football a match could be a completed pass and the miss is an incomplete pass. The football game includes the provision of negative effects, e.g., match count reductions, for example, if the quarterback is sacked or for an interception. The football game also includes bonusing, for example, if a play results in a touchdown or first down. In one implementation, the bonus is an extra match. In other implementations, the bonus is an extra player pick, an extra game draw or any of the other bonus embodiments described above.

The game of FIGS. 9A and 9B is alternatively displayed using a baseball format. A match, in one implementation, is a base hit, and a miss is a groundout or pop fly. The baseball embodiment includes negative effects, for example, when the player strikes out. A bonus is awarded in one implementation for a homerun or other event.

Any game having a goal or net, such as hockey or soccer, is also readily adapted to the games illustrated in connection with FIGS. 9A and 9B. A match is illustrated as a goal in one implementation. A miss is a shot that is blocked or otherwise is not on or at the net.

In a skiing example, gaming device 10 shows a ski jump, slalom or downhill race. A match is a successful or relatively long jump, or a winning of a race in downhill skiing. In slalom skiing, the draws can be the flags, wherein a match is a successful negotiation of one of the flags. Misses are shown respectively, for example, as crashes after a ski jump, losing the race for downhill skiing and missing a flag or losing in a slalom race. Bonuses are awarded, for example, if the player sets a record time, etc. Points or counts are taken away from the player, for example, for crashing during a jump, missing one or more slalom flags or for an exceptionally slow finish.

Any type of racing event is also adapted to the embodiments of FIGS. 9A and 9B. Racing includes downhill or slalom skiing as described above or any other type of race environment, such as auto racing, motorcycle racing, boat racing, horse racing, dog racing, etc. A match is illustrated as the player, a player representative object or a player's wagered object (e.g., pick of a horse) winning the race, meeting a certain marker within the race in a preset amount of time or for passing a competitor. A miss is illustrated as not winning the race, being passed by the competitor or not reaching a milestone within a certain period of time. It should be appreciated that any other type of sporting activity, leisure activity, game or any type of competitive event having a successful outcome and an unsuccessful outcome can be adapted for the embodiments of FIGS. 9A and 9B.

The above-described activities include special situations that occur, which result in a negative outcome for the player. In one embodiment, the negative outcome is the removal of one or more matches or hits from a tally of matches and hits. In an alternative embodiment, the negative outcome is the removal of or non-use of one or more of the game drawn numbers or the player's picks. In another implementation, a negative outcome is associated with a match occurring on a particular pick or at a certain point in the order of picks, rather than being associated with a particular number. For example, a match is removed or not counted if it occurs on the first pick by the player, a certain intermediate pick by the player or a final pick by the player.

Each of the embodiments described herein can be associated with a player bonus as opposed to or in addition to a player detriment. That is, one or more of the game drawn numbers, one or more of the player's picks or one or more of the matches, e.g., an order of a match, results in an additional game drawn number, an additional pick and/or an additional match tally, etc. Any of the bonusing events can be provided as a progressive type bonus or a bonus that requires multiple contributions prior to payout. With progressives, a player might contribute to a bonus and not ultimately achieve the bonus if the player discontinues play before the requirements for the progressive are achieved On the other hand, the player might reap the reward of prior play by completing a progressive that had been partially completed by a prior player.

Weighted Number Matching

The previous embodiments teach various number matching games in which the game drawn numbers and the player's picks have a unitary or equal value. That is, any single drawn number is not weighted relative to any other drawn number in the previous embodiments (notwithstanding that certain drawn numbers or player's picks can have an additional bonus or detrimental effects).

Likewise, in the previous embodiments, the player's picks and the order in which a match occurs each have a unitary value and are weighted equally except for a possible bonus event. The previous games have therefore been tallied in traditional fashion, i.e., matches are counted and a paytable associates a threshold amount of matches with an award and increasing awards for increasing amounts of matches above the threshold. Referring for example to the display device 14 in FIGS. 1, 3 and 4, in a game where the player picks ten numbers and the game draws twenty numbers from a field of eighty numbers, the game requires at least five hits to obtain any type of award. That is, the player must match fifty percent of the player's picks to win any amount. In the situation where the player achieves five hits, the game pays four dollars or four credits for every coin or dollar wagered by the player. As the percentage of hits increases, the awards increase exponentially as the odds decrease exponentially.

Figure 11A:
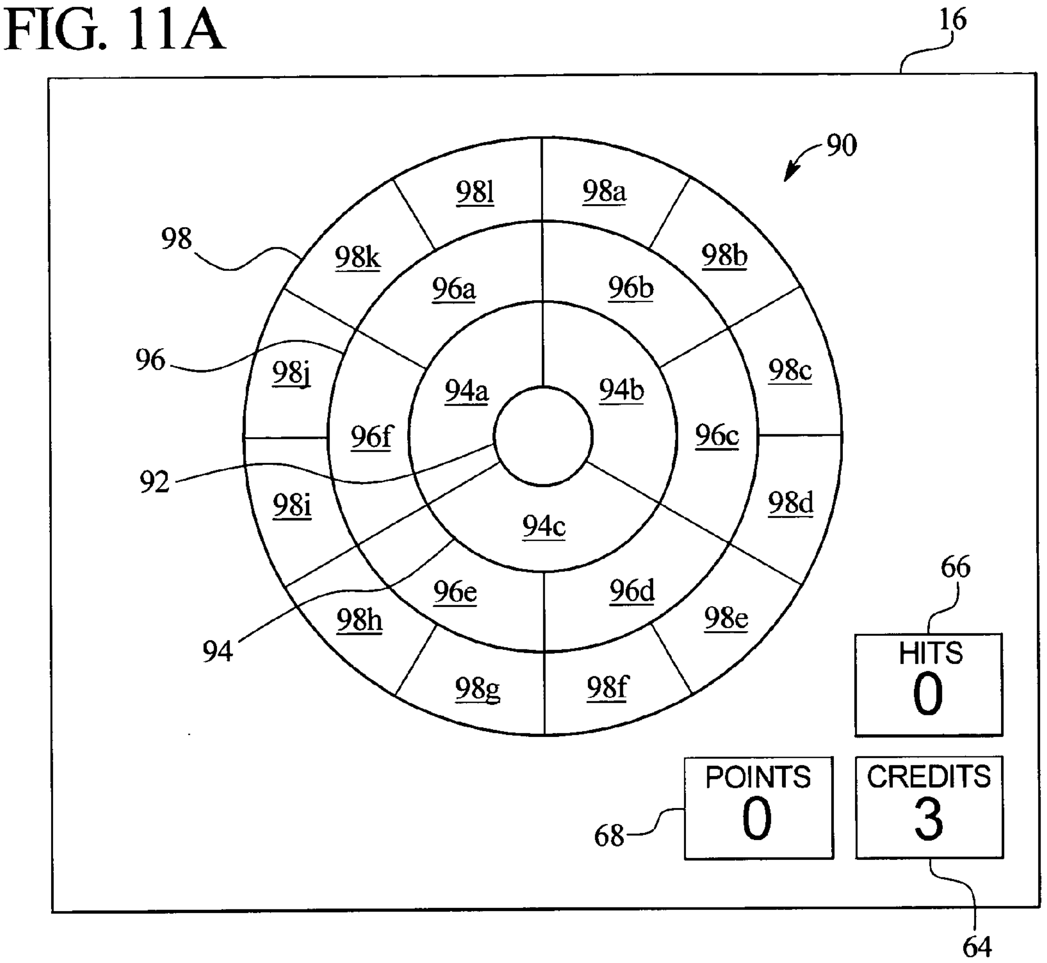
FIGS. 11A, 11B, 12A, 12B and 13 illustrate various screens of a display device of a gaming device having a Keno, Lotto, or Bingo-type game that weights the game so that different Keno game components are worth different amounts.

Any of the previous embodiments illustrated in FIGS. 6A to 10 can alternatively be tallied or evaluated in the manner shown in connection with FIGS. 11A to 12. FIGS. 11A to 12 illustrate a different method of evaluating a number matching game. In FIGS. 11A to 12, the player picks a certain amount of numbers from a set of numbers, the game draws randomly a certain amount of numbers from the set and the game looks for matches between the player's picks and the game drawn numbers. Here, however, the gaming device 10 does not weight equally one or more of the number matching components, namely, one or more of the draws, picks or matches. That is, at least one of the draws, picks or matches has at least one number or match that is weighted unequally with the remainder of the numbers or matches.

The weighting of the components can occur in a plurality of ways. The weighting takes place in one implementation as a percentage of a whole. For example, various ones of twenty game drawn numbers are weighted for example at three percent, five percent or ten percent. In another implementation, the weighting takes place by assigning points or values to one or more drawn numbers. For example, one drawn number is associated with the value of three, another with the value of five and another with the value of ten. It should be appreciated that weighting with points does not have to occur via whole numbers or integers. Additionally or alternatively, non-integer numbers, fractions, decimal numbers or other suitable configurations can be used to weight components.

While the following description discusses the drawn numbers being weighted, the following description applies equally to weighting the player picks or the game matches. The percentages for a set of eighty numbers can be divided up so that instead of each number having a percentage of 1.25, one or more or all of the numbers have a percentage that is more or less than 1.25. The percentages of the eighty numbers add to one hundred. In an embodiment, the percentages of the numbers drawn by the game that are matched with player picks are tallied. The overall percentage for each of the drawn numbers creating matches is then compared to a paytable stored in the memory device 40 (illustrated in FIG. 2). The paytable, similar to the paytable in display device 14 of FIGS. 1, 3 and 4, correlates the overall percentage to an award for the player.

Alternatively, the weighting occurs by assigning points to one or more or all of the possible drawn numbers one to eighty. The points associated with the drawn numbers that create a match with the player's picks are tallied to provide an overall amount of points. The memory device 40 of gaming device 10 stores a paytable that correlates the tallied points against an award, if any, for the player.

Both of the percentage weighting and point weighting embodiments can be scaled and the paytables arranged so that the overall effect is similar to the unitary weighting, where a threshold amount of hits or matches is required to achieve any award. Also, awards can increase exponentially as the percentage of hits increases past the threshold. The weighting system on the other hand enables the game implementor to create diverse types of payout schemes, where gaming device 10 pays back a percentage or portion of the player's wager, for example, for any amount of hits including for only a single hit.

FIG. 11A illustrates display device 16 with a target display 90. Target display 90 includes a bull's-eye 92 and sequentially larger rings 94, 96 and 98. In one embodiment, gaming device 10 proceeds in a manner similar to the games described in connection with FIGS. 5A to 10. That is, the player picks the numbers from display device 16 as shown in FIG. 1. Afterward, gaming device 10 removes the display of the entire set of eighty numbers and displays instead target display 90. At some time before the display 90 is presented (before, during or after player picks numbers), gaming device 10 draws randomly a plurality of numbers, e.g., twenty numbers.

In one implementation, bull's-eye 92 is associated with ten points. The three segments 94*a* to 94*c* associated with ring 94 are worth five points each. The six segments 96*a* to 96*f* are each worth two points. The twelve segments 98*a* to 98*l* of ring 98 are each worth one point in the example. The embodiment of FIG. 11A corresponds to FIG. 5A, wherein the drawn numbers are not shown.

After establishing the rings, segments and points associated therewith, gaming device 10 can proceed in a variety of ways. In one implementation, the association with the points is made according to an order. For example, gaming device 10 can associate points to game drawn numbers based on the order in which the numbers are drawn. The bull's-eye could be drawn first, the segments of ring 94 could be drawn second, the next six segments of ring 96 could be drawn third and the next twelve segments of ring 98 could be drawn last. It should be appreciated that after a draw of twenty numbers, two of the segments of target 90 would not be associated with a drawn number. Alternatively, twenty-two numbers are drawn, one for each segment.

Another way to establish the associations is via the player's picks. For example, the first player resulting in a match or otherwise is associated with bull's-eye 92, the next three picks with ring 94 and so on. A further way to associate the values of target 90 is to determine that a particular match is associated with a particular segment. For example, the first match could be associated with one of the segments 98*a* to 98*l*. A second match could be associated with one of the segments 96*a* to 96*f*. A third match could be associated with segments 94*a* to 94*c* and the fourth match associated with bull's-eye 92.

The display of the player's picks is provided via any of the embodiments described above, for example, via the appearance of darts, arrows, bullets or other type of projectiles either hitting one of the segments, the bull's-eye or an area outside of target display 90. Display device 16 of FIG. 11A also includes the hits meter 66 and the credit meter 64. As the matches accumulate, the hits meter 66 increments. Hits meter 66 shows alternatively the points accumulated with the segments 94, 96 and 98 and bull's-eye 92. Further alternatively, the points accumulated via matches are displayed in points meter 68.

Although the points associated with the bull's-eye 92 and rings 94, 96 and 98 have been illustrated previously as positive values, one or more of the segments or rings is alternatively associated with a negative value. Further alternatively, the rings are associated with a range of values, wherein, for example, ring 94 has a higher range than ring 96, which has a higher range on average than ring 98. The points for any particular match are selected randomly or in a predetermined manner from an appropriate range.

When the player's picks are exhausted, the total points shown either in hits meter 66 or points meter 68 is correlated with an award via a database stored in memory device 40, wherein the award, for example, is an updated amount of credits in credit meter 64. In an alternative embodiment, the points determine a modification of a base award. For example, gaming device 10 in one embodiment awards the player based solely on the number of hits accumulated in hits meter 66 via the known unitary method of playing Keno-type game as a base award. The points associated with either the drawn numbers, the player's picks or the matched numbers are then accumulated in points meter 68, which is correlated via a suitable paytable with a bonusing type of award to modify the base award from the number of hits. For example, the bonusing award can multiply the base award, add to the base award or otherwise mathematically alter the base award. Further, the additional award via the accumulated points is alternatively any non-monetary or other type of bonus award described above. The bonus could also include an entry into a bonus game or a contribution towards a bonus game, award or progressive award As described above in connection with FIGS. 6A to 6D, the bull's-eye 92 and the various segments of rings 94, 96 and 98 may each house or correspond to one or more drawn numbers, one or more player picks and one or more matches. For example, the segments 94*a* to 94*c* could each include a plurality of associated drawn numbers, wherein the points associated with each segment are the same or different.

It is possible that the points include fractional values, decimal values or are otherwise non-integers. The percentage weighting, i.e., associating a percent of a whole with a drawn number, a picked number or a match, also allows for non-integer or fractional type of weighting.

The points can be negative, so that while the hits meter 66 increments upon a match, the points meter 68 decreases. Negative points are associated alternatively with draws, picks and/or matches. It is also contemplated in a game in which a relatively large percentage of drawn numbers are associated with negative points, to provide a game that draws most all or all of the possible numbers, e.g., numbers one to eighty. Here, the game hinges on the player's luck in picking positive point draws and not necessarily on drawing a certain number of matches.

Figure 11B:
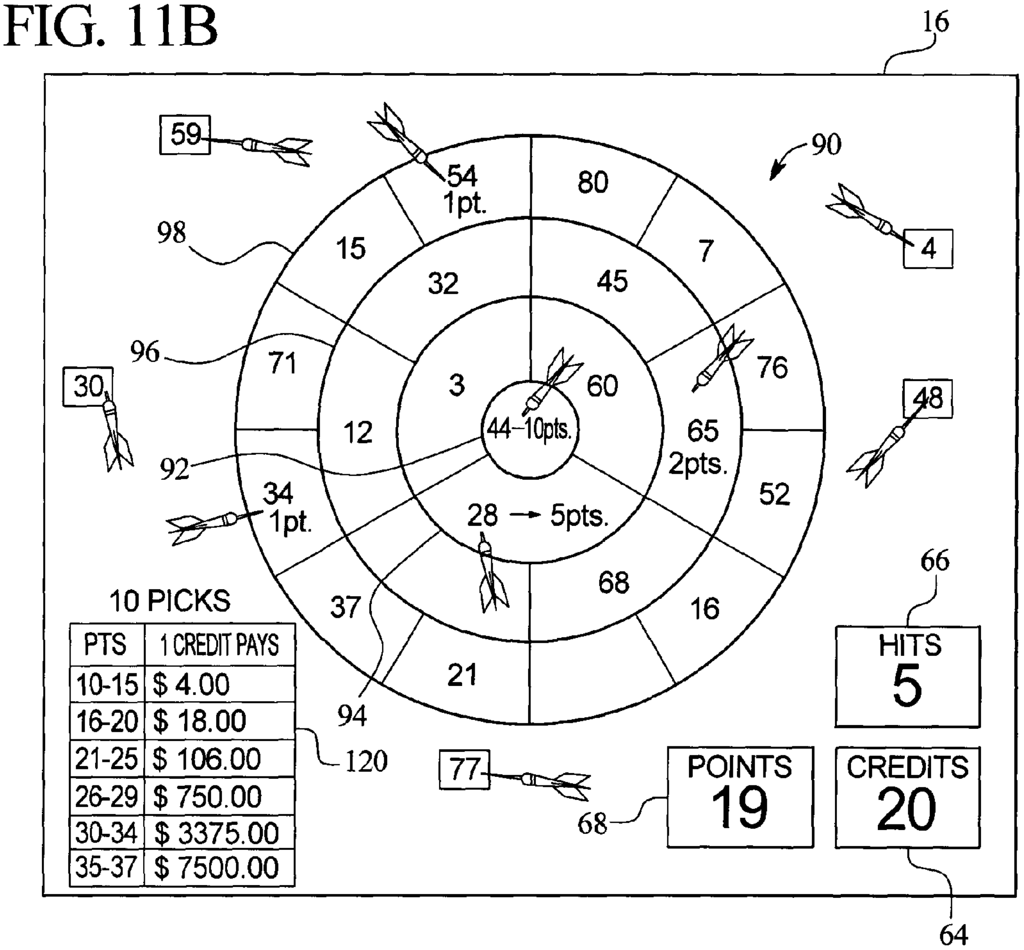

FIG. 11B shows the game at its end. The player has the same five matches as above, namely, numbers 28, 34, 44, 54 and 65 and misses, namely, numbers 4, 30, 48, 59 and 77. The matches correspond to point totals of five, one, ten, one and two, respectively, yielding nineteen in total. The point structure is as described above, ten for the bull's-eye, five for ring 94, two for ring 96 and one for ring 98. Nineteen points according to paytable 120 yields a payout of eighteen credits or dollars. The player's total credits after beginning with three in FIG. 1, losing one credit for playing the game and gaining eighteen is twenty as seen in credit meter 64 of FIG. 11B.

Figure 12A:
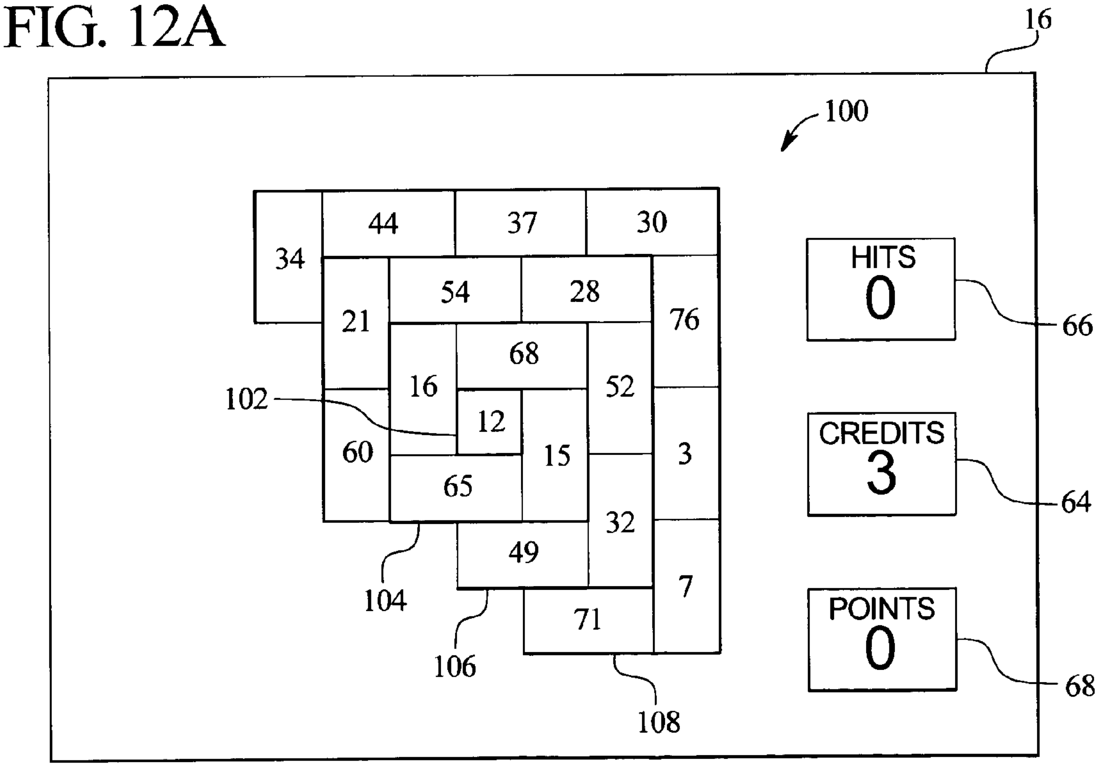

Referring now to FIG. 12A, display device 16 illustrates an alternative target display 100. Target display 100 shows a bull's-eye-type target 102 and rings of brick-like segments 104, 106 and 108. FIGS. 11A and 12A illustrate that the target displays can have any desired shape, as can the segments. Hits meter 66, credit meter 64 and points meter 68 are also illustrated. The rings could be associated with varying points or point ranges or as shown below, the points can be assigned randomly.

Figure 12B:
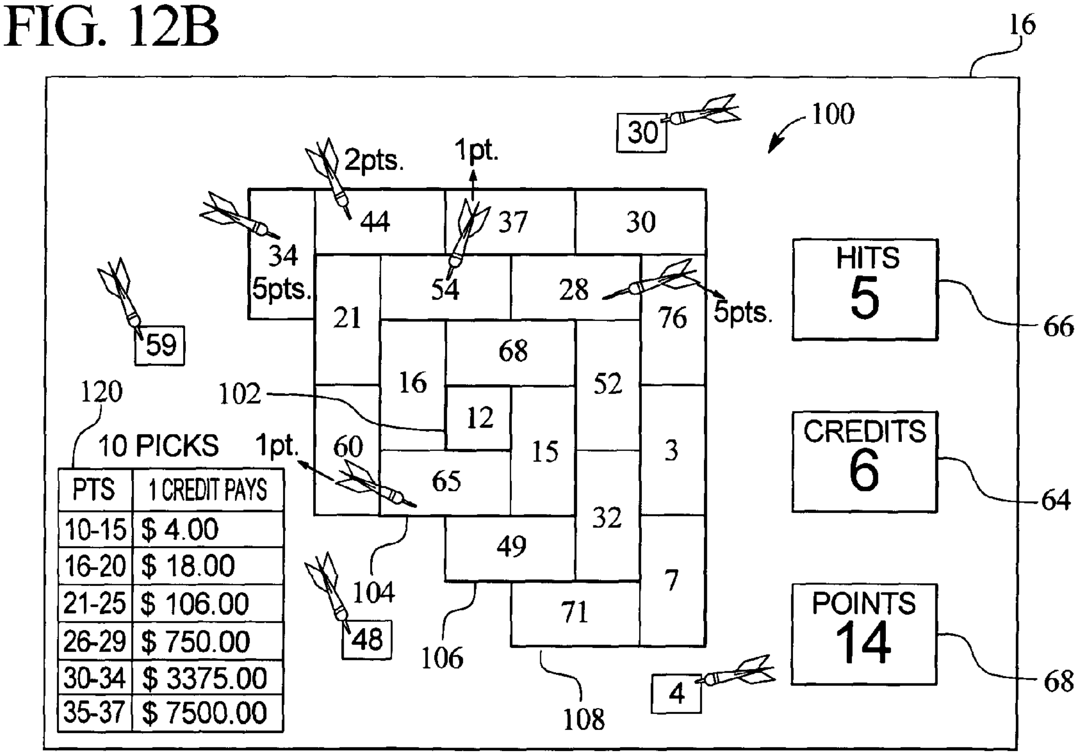

In the displays 90 and 100 of FIGS. 11A and 12A, the darts, arrows or other projectiles can travel sequentially around the different rings, yielding hits or misses. For example, in FIG. 12A, the drawn numbers are drawn and displayed in order from the bull's-eye 102 (twelve), clockwise or counterclockwise around ring 104 (68, 15, 65 and 16), clockwise or counterclockwise around ring 106 (60, 21, 54, 28, 52, 32 and 49), clockwise or counterclockwise around ring 108 (34, 44, 37, 80, 76, 3, 7 and 71). Then the player's picks are provided sequentially (FIG. 12B), each showing either a hit (bull's-eye or ring) or miss (object landing outside of display 100). The points associated with the matches are then tallied and an award provided as seen in FIG. 12B. While the instant example discloses the game drawn numbers being displayed before the player's picks, the embodiments herein do not require the player's and game's numbers to be displayed in any particular order.

FIG. 12B illustrates the same matches and misses as shown above. In FIG. 12B, the points are associated randomly to matches 28, 34, 44, 54 and 65 as five, five, two, one and one, respectively, yielding fourteen in total. Fourteen points according to paytable 120 yields a payout of four credits or dollars. Starting from FIG. 1, the player's total credits increases from three to six as seen in credit display 64 of FIG. 12B.

Figure 13:
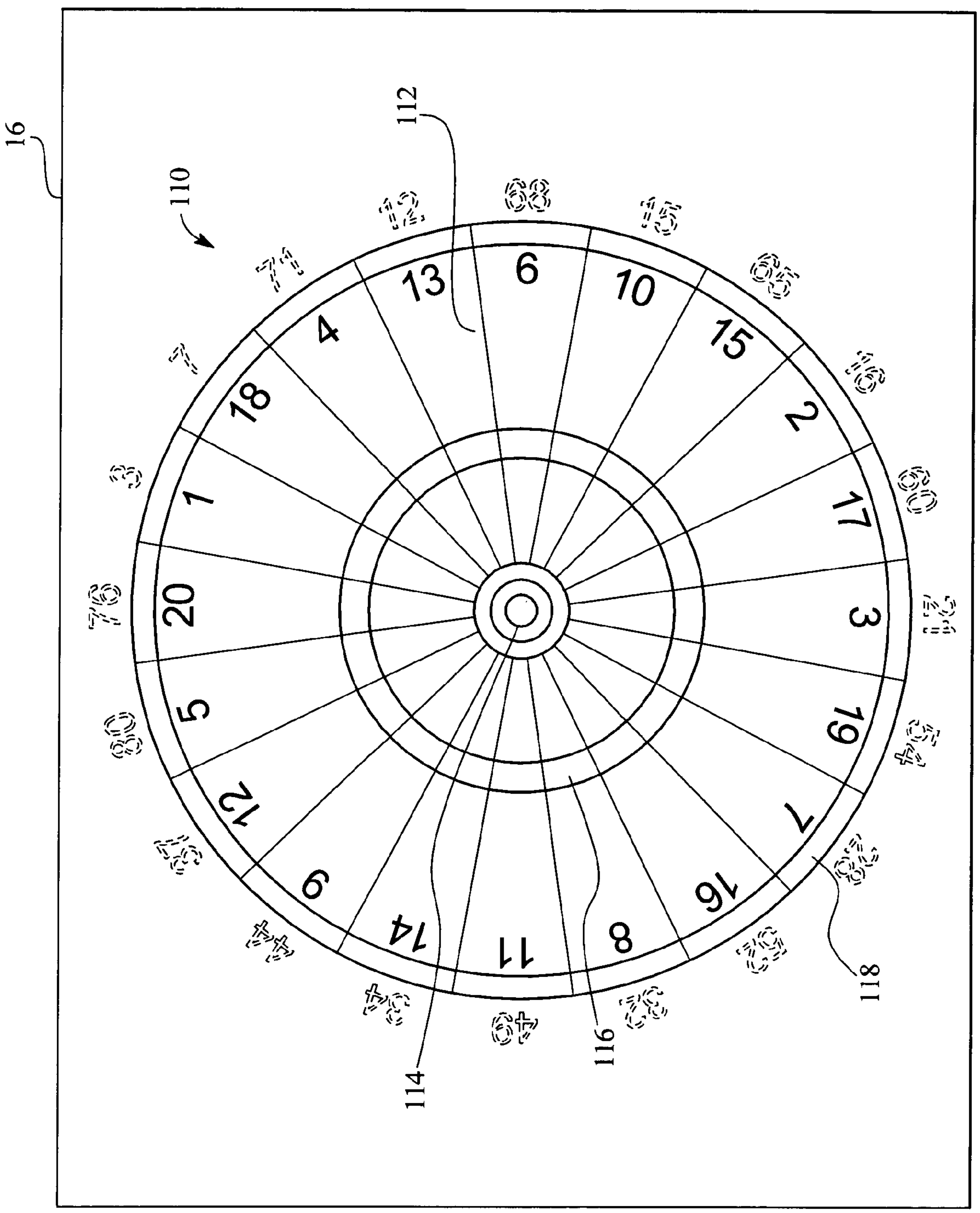

Referring now to FIG. 13, a display 110 is shown on display device 16, wherein display 110 is substantially the same as a true dartboard. In the game of FIG. 13, the points associated with the wedges 112 are the points associated with the game of darts. The numbers displayed are the point values rather than the game drawn numbers or the player's picks. The game drawn numbers are illustrated in phantom outside of dartboard 110 and may or may not be displayed initially. The game drawn number of seventy-six, for example, corresponds to the point value of twenty. If the player picks the number seventy-six, the player receives twenty points or a multiple thereof as described below. A paytable operating with display 20 is scaled so that twenty points is a relatively good point value and one point is a relatively bad value.

Display 110 includes a bull's-eye 114, inner bonus ring 116 and an outer bonus ring 118. In one embodiment, gaming device 10 employs two draws, one to determine which drawn numbers are associated with which wedges 112 and a second draw to determine whether: (i) if applicable, the dart (player pick) should hit one of the bonus award rings 116 or 118 or (ii) if applicable, whether the player pick should be associated with the inner, central or outer portion of bull's-eye 114. The multiple draws can be implemented in a variety of ways. In one implementation, gaming device 10 draws two sets of twenty numbers. In the first draw, gaming device 10 determines a base drawn number, such as the number seven. As seen in FIG. 13, the number seven corresponds to a point value of eighteen. In the second draw, gaming device 10 determines whether the number seven appears again. If the number seven appears again, the gaming device randomly generates whether to show the player pick or dart hit the tripling bonus section 116 or the doubling bonus section 118. Thus, if the player has picked the number seven and the gaming device generates the number seven in both draws, the player obtains the base number of points, seven, multiplied either two times or three times. Obviously, the multipliers can vary and indeed the bonus rings 116 and 118 can provide any type of bonus award described herein.

In one embodiment using dartboard 110, each of the segments or wedges 112 is assigned to or associated with a probability or odds weighting as discussed above. As numbers are drawn, they are associated with one of the wedges 112. That is, a first random generation determines which number is drawn and a second random generation, using the weighted display 110, determines to which wedge 112 the number is associated. The wedges can therefore be associated with a plurality of drawn numbers. More likely, higher valued wedges have a lower weighting probability.

The doubling and tripling rings 118 and 116, respectively, are also weighted within each wedge and are also weighted lower, typically, than the non-multiplied areas of the wedges 112. The wedges or segments are each associated with a value that is either provided directly to the player or added to other award values, wherein the accumulated points are compounded to a paytable or player awards. Bullseye 114 (and any of its portions) is/are weighted commensurate with the value obtained for matching a drawn number associated with same. In an alternative embodiment, one or more or all of the wedges are 112, the doubling 118 or tripling 116 areas thereof, and bullseye 114 have a limit as to how many numbers to which they can be assigned. The limit can be one or more.

The methodology for coordinating separate draws disclosed in connection with FIG. 13 can be provided in a multitude of ways. For example, gaming device 10 can draw randomly from numbers one to eighty and then draw again from the originally selected numbers one or more times for the doubling bonus 118, the tripling bonus 116 and/or the bull's-eye 114.

Referring now to FIG. 14, various activities are listed to show, without limitation, that the weighted number matching game can be implemented in a multitude of ways, for example, on display device 16. For example, in one hunting implementation, animals are weighted differently so that certain animals provide more points than others if hit. In shuffleboard, different shuffleboard areas are weighted differently.

Gaming device 10 in various embodiments weights the player's picks, the game draws and/or particular matches or hits. In pool, for example, certain shots or player picks are weighted differently. The weight of the pool shots can correspond to perceived difficulty, length of shot, bank shots, etc. Additionally or alternatively, certain pockets or game draws are weighted differently. Certain successful shots or matches, can alternatively or additionally be weighted higher or lower than others.

The values of the draws, picks or matches are also shown visually and/or audibly to the player in one embodiment. For example, in a ski jump, a more highly weighted draw or pick is shown by a longer jump. For downhill or slalom skiing, a more valuable number of points is shown by a faster finishing time. In an equestrian riding or dog jumping embodiment, higher jumps or shorter finishing times correspond to more points or a higher weighted percentage. In football, higher points or higher percentages can correspond to more yards gained or a score. Weighted number matching can yield negative points or outcomes as described above, wherein for example the football player loses yardage. In baseball, the points can be distributed visually through a single, double, triple homerun or runs batted in. In hockey or soccer, each goal could be rated sequentially higher.

Bonusing for Number Matching Game

Any of the embodiments described previously can utilize Keno bonusing. Indeed, bonusing has been described throughout the application with both the inverted number matching embodiments and the weighted number matching embodiments. In one embodiment, the bonusing is tied to the player's picks. Here, each pick regardless of whether it creates a match is weighted or has a number of points associated with it. The points from each of the player's picks are tallied to determine a total. The bonus, which can be in any form described above, is paid according to a paytable that associates the point tally with the bonus award. The bonus pay operates independent of a pay associated with matched picks and draws.

The bonus pay is independent of the base pay in an embodiment. In another embodiment, the bonus award are modifiers that modify base values. In one example, the base value is determined via the unitary method of counting numbers of hits between game draws and game picks. Further, bonus points can count towards a contribution to a bonus game or progressive game or payout, which is played by or paid to the current or subsequent player.

In another embodiment, the player's picks are evaluated on a unitary basis to determine whether the player receives a bonus. That is, the gaming device randomly chooses a bonus number and compares it to the player's picks to determine if a match occurs. If a match occurs, the player receives a bonus, which can be paid out in any of the types and manners described above. In another embodiment, gaming device 10 requires a side wager for the player to be eligible for the bonus, e.g., to enable the game to randomly generate a number to compare with the player's picks to determine a bonus.

In a further embodiment, the bonus is connected with game draws. In an embodiment, the gaming device 10 makes multiple draws. One group of draws determines a base award and a second group of draws determines whether a bonus is applied either to modify the base award or as a stand alone award. The draws can include any percentage of the numbers from the set of, for example eighty, numbers. In one embodiment, gaming device 10 is precluded from drawing the same number in both draws, which has the effect of tending to lessen the ability of the player to obtain both a high base award and a bonus award. That is, because the bonus numbers are removed from the pool of numbers that can match the player's picks for a base award, there is less chance of accumulating matches in the base game. Likewise, the drawn numbers for the base game remove potential matches from the drawn numbers used to determine the bonus.

In addition to each of the embodiments described above for Keno bonusing, it is contemplated that any of the number matching bonus embodiments described herein could instead yield a negative award. For example, certain negative bonuses can decrease a match count, decrease a point value associated with a match or provide negative points to a point total.

The present invention also includes as a bonus feature designating one or more of the picks, one or more of the numbers, or one or more of the matches as special. Here, the actual number either drawn by the game or picked by the player can have a special bonusing feature, for example, a positive or negative impact on a base award or a positive or negative stand alone value. For example, the mere selection of a lucky number, such as the number seven, yields a bonus, or an unlucky number yields a negative effect.

The present invention also includes designating either randomly or in a predetermined manner subsets of values picked and values drawn by the game. Gaming device 10 then uses the subsets to determine whether the player receives a bonus, for example a multiplier, by determining if the designated set of picks has one or more or a required percentage of matches with the designated draws. For example, if the player picks ten numbers and gaming device 10 draws twenty numbers, gaming device 10 randomly generates for example four numbers from the draw numbers and two numbers from the player's picks and provides a bonus if any of the specially selected numbers match.

Bonusing alternatively occurs upon a certain order, for example if the first, last or intermediate number picked by the player or drawn by the game results in a match. In another embodiment, gaming device 10 randomly determines which pick or draw, regardless of the number actually picked or drawn, results in a bonus. The bonus can or may not be contingent upon whether the designated bonus selection results in a match.

While the present invention has been described in connection with number matching, any of the embodiments described herein are applicable equally to symbol matching, i.e., using symbols other than or in combination with numbers. The eighty number Keno embodiment described above could instead use eighty different symbols, such as eighty different words. The matching games can use logos, such as sports team logos instead of numbers. In that embodiment, the player can play his or her favorite teams. The symbols can also relate to a theme of the game. For example, in the hunting games described above, the symbols purchased by the players could be animals, while the drawn numbers are displayed as bullets. The term symbol therefore includes "number" and any other suitable or theme related indicia used alternatively or additionally.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

a display device including a first area and a different, separate second area, said display device configured to display a keno game operable upon a wager by a player, said keno game including a plurality of symbols; and a processor programmed to operate with the display device to:

(a) display said plurality of symbols of the keno game;

(b) enable the player to pick a first quantity of the displayed symbols, said first quantity being at least one and less than all of the displayed symbols;

(c) randomly draw a plurality of the displayed symbols;

(d) cause the first area of the display device to display each of the selected player symbols that yields a match with one of the drawn symbols without displaying each of the selected player symbols that does not yield a match with one of the drawn symbols wherein the first area is divided into at least two sections, each section associated with a different award value, wherein each matched selected player symbol is associated with one of the sections of the area, and wherein the matched player symbols are associated with the sections according to an order in which the selected player symbols are selected by the player;

(e) cause the different, separate second area of the display device to display each of the selected player symbols that does not yield a match with one of the drawn symbols without displaying each of the selected player symbols that yields a match with one of the drawn symbols; and (f) display an award to the player for the keno game, said award contingent, at least in part, upon how many matches occur between the selected player and the drawn symbols.

2. The gaming device of claim 1, wherein each matched selected player is associated with one of the sections randomly.

3. The gaming device of claim 1, wherein the first area is divided into at least two sections, and wherein the player designates which section to place any matched selected player symbol.

4. The gaming device of claim 1, wherein the award is provided only if a threshold amount of matches occur.

5. The gaming device of claim 1, wherein the award is provided only if a threshold amount of points associated with any matches is accumulated.

6. A gaming device comprising:

a display device configured to display a game operable upon a wager by a player, said game including a plurality of symbols; and a processor programmed to operate with the display device to:

(a) cause at least one of the symbols to be selected for the player without displaying said selected symbols;

(b) randomly draw at least one of the symbols;

(c) after each drawn symbol has been drawn:

(i) display each selected player symbol within a first circular display area if a match occurs between said selected player symbol and one of the drawn symbols, wherein none of the selected player symbols that do not yield a match with one of the drawn symbols are displayed within the first circular display area, wherein the first circular area is divided into at least two sections, each section associated with a different award value, wherein each matched selected player symbol is associated with one of the sections of the area, and (ii) display each selected player symbol outside of said first circular display area if a match does not occur between said selected player symbol and one of the drawn symbols; and (d) display an award to the player contingent, at least in part, upon how many matches occur between the selected player symbols and the drawn symbols.

7. The gaming device of claim 6, which includes an area of the display device in which each selected player symbol that yields any match is displayed.

8. The gaming device of claim 6, wherein the selected player symbol and any match are displayed as part of an activity.

9. The gaming device of claim 8, wherein the activity is a sport.

10. The gaming device of claim 6, wherein a plurality of the selected player symbols are displayed sequentially to show if the selected player symbols match the drawn symbols.

11. The gaming device of claim 6, wherein the match is weighted and the award is based on the weighted match.

12. The gaming device of claim 6, wherein the award is provided only if a threshold number of matches occurs.

13. The gaming device of claim 6, wherein the award is provided only if a threshold amount of points associated with any matches is accumulated.

14. The gaming device of claim 6, wherein the game is based on Keno, Lotto, or Bingo.

15. A gaming device comprising:

a display device configured to display a game operable upon a wager by a player, said game including a plurality of symbols; and a processor programmed to operate with the display device to:

(a) cause at least one of the symbols to be selected for the player, wherein each selected player symbol is placed in a queue and not displayed until a match area is displayed on the display device, wherein the match area includes a circular display area;

(b) randomly draw at least one of the symbols;

(c) display the selected player symbol in the match area if the selected player symbol matches the drawn symbol, wherein none of the selected player symbols that do not yield a match with one of the drawn symbols are displayed within the match area, wherein the match area is divided into at least two sections, each section associated with a different award value, wherein each matched selected player symbol is associated with one of the sections of the area; and (d) display an award to the player contingent, at least in part, upon how many matches occur between the selected player symbols and the drawn symbols and which sections the selected player symbols are associated with.

16. The gaming device of claim 15, wherein the award is provided only if a threshold number of matches occurs.

17. The gaming device of claim 15, wherein the award is provided only if a threshold amount of points associated with any matches is accumulated.

18. The gaming device of claim 15, wherein the game is based on Keno, Lotto, or Bingo.

19. A wagering game comprising:

a display device configured to display a keno game operable upon a wager by a player, said keno game including a plurality of symbols;

a processor programmed to operate with the display device to:

(a) display said plurality of symbols of the keno game;

(b) enable the player to pick a first quantity of the displayed symbols, said first quantity being at least one and less than all of the displayed symbols;

(c) randomly draw a plurality of the displayed symbols;

(d) after said draw, display each selected player symbol:

(i) in a first manner if the symbol yields a match with one of the drawn symbols, wherein the first manner does not include displaying any of the selected player symbols that do not yield a match with one of the drawn symbols, wherein the first manner includes a successful sporting event outcome; and (ii) in a different and separate second manner if the symbol does not yield a match with one of the drawn symbols, wherein the second manner includes an unsuccessful sporting event outcome;

(d) display an award to the player for the keno game, said award contingent, at least in part, upon how many matches occur between the selected player symbols and the drawn symbols.

20. The wagering game of claim 19, wherein the award is based on a weighting associated with at least one of any matches.

21. The wagering game of claim 19, wherein the award is provided only if a threshold amount of matches occurs.

22. The wagering game of claim 19, which includes a plurality of selected player symbols and drawn symbols provided to the player, wherein at least one of the selected player symbols or the drawn symbols is taken away from the player upon one of the matches.

23. The wagering game of claim 19, which includes a plurality of selected player symbols and drawn symbols provided to the player, which includes at least one additional selected player symbol or drawn symbol provided to the player upon one of the matches.

24. The wagering game of claim 19, which includes an option provided to the player to purchase at least one additional selected player symbol in exchange for at least one game credit.

25. The wagering game of claim 19, wherein the symbols are selected from the group consisting of: numbers, logos, words, letters and any combination thereof.

26. A method of operating a gaming device comprising the steps of:

(a) displaying a set of symbols in a keno game, said set of symbols including a plurality of displayed symbols;

(b) enabling a player to select a first quantity of the displayed symbols, said first quantity being at least one and less than all of the displayed symbols;

(c) randomly drawing a plurality of the symbols;

(d) after said symbols have been drawn;

(i) displaying each selected player symbol within a first circular display area if a match occurs between said selected player symbol and one of the drawn symbols, wherein none of the selected player symbols that do not yield a match with one of the drawn symbols are displayed within the first circular display area, and (ii) displaying each selected player symbol outside of said first circular display area if a match does not occur between said selected player symbol and one of the drawn symbols; and (e) displaying an award to the player for the keno game, said award contingent upon at least one match between the selected player symbol and the drawn symbol.

27. The method of claim 26, which includes displaying each of the randomly drawn symbols first before displaying any selected player symbols.

28. The method of claim 26, which includes the step of removing symbols not randomly drawn and displaying only the randomly drawn symbols first before displaying any selected player symbols.

29. The method of claim 26, wherein awarding the player includes tallying points associated with any matched symbols.

30. The method of claim 26, wherein steps (a) to (e) are provided via a data network or a computer storage device.

31. The method of claim 30, wherein the data network is an internet.

* * * * *